US012795491B2

(12) United States Patent
Xie et al.

(10) Patent No.: US 12,795,491 B2
(45) Date of Patent: Nov. 10, 2026

(54) TECHNIQUES FOR ENHANCING PAGE SHARING USING A CHANNEL QUALITY-BASED MERGE CONDITION FOR DUAL-SUBSCRIPTION DEVICES

(71) Applicant: QUALCOMM INCORPORATED, San Diego, CA (US)

(72) Inventors: Ling Xie, Beijing (CN); Rishika Tindola, Hyderabad (IN); Subashini Krishnamurthy, San Diego, CA (US); Uttam Vyas, Hyderabad (IN); Tom Chin, San Diego, CA (US); Daowei Lin, Shenzhen (CN)

(73) Assignee: Qualcomm Incorporated, San Diego, CA (US)

( * ) Notice: Subject to any disclaimer, the term of this patent is extended or adjusted under 35 U.S.C. 154(b) by 400 days.

(21) Appl. No.: 18/041,671

(22) PCT Filed: Oct. 14, 2021

(86) PCT No.: PCT/CN2021/123718
§ 371 (c)(1),
(2) Date: Feb. 14, 2023

(87) PCT Pub. No.: WO2022/078423
PCT Pub. Date: Apr. 21, 2022

(65) Prior Publication Data

US 2023/0319668 A1 Oct. 5, 2023

(30) Foreign Application Priority Data

Oct. 14, 2020 (WO) ................ PCT/CN2020/120812

(51) Int. Cl.
*H04W 36/30* (2009.01)
*H04B 17/318* (2015.01)
(Continued)

(52) U.S. Cl.
CPC .......... *H04W 36/30* (2013.01); *H04B 17/328* (2023.05); *H04B 17/336* (2015.01); *H04W 36/0085* (2018.08); *H04W 36/08* (2013.01)

(58) Field of Classification Search
CPC . H04W 36/30; H04W 36/0085; H04W 36/08; H04B 17/336; H04B 17/328
(Continued)

(56) References Cited

U.S. PATENT DOCUMENTS 9,386,626 B1 * 7/2016 Hsu ......................... H04J 13/00
9,402,274 B1 7/2016 Rajurkar et al.
(Continued)

FOREIGN PATENT DOCUMENTS

CN 101420713 A 4/2009
CN 111758282 A 10/2020
(Continued)

OTHER PUBLICATIONS

International Search Report and Written Opinion—PCT/CN2020/120812—ISA/EPO—Jul. 20, 2021.
(Continued)

*Primary Examiner* — Asad M Nawaz
*Assistant Examiner* — Hugh Mark Ashley
(74) *Attorney, Agent, or Firm* — HOLLAND & HART LLP/QUALCOMM

(57) ABSTRACT

Methods, systems, and devices for wireless communications are described. In some systems, a user equipment (UE), such as a dual-subscription UE, support a first subscription and a second subscription. The first subscription may be in an active mode with a first cell and the second subscription may be in an idle mode with a second cell, and the UE may determine whether to exit or postpone entrance into a merged state in which the UE may perform idle mode measurements for the second subscription using the first
(Continued)

subscription and the first cell based on a channel quality-based merge condition. For example, the UE may measure a channel quality associated with a communication link between the UE and the first cell and, in examples in which the measured channel quality fails to satisfy a threshold channel quality, the UE may exit or postpone entrance into the merged state.

24 Claims, 12 Drawing Sheets

(51) Int. Cl.
*H04B 17/336* (2015.01)
*H04W 36/00* (2009.01)
*H04W 36/08* (2009.01)

(58) Field of Classification Search
USPC .......................................................... 370/331
See application file for complete search history.

(56) References Cited

U.S. PATENT DOCUMENTS

2012/0224470 A1* 9/2012 Jeong .................. H04L 43/0811 370/221
2016/0302114 A1 10/2016 Jain et al.
2016/0353516 A1 12/2016 Rajurkar et al.
2016/0373948 A1* 12/2016 Sanka ............... H04W 36/0085
2016/0381710 A1* 12/2016 Bansal .................... H04W 8/00 370/336
2017/0064662 A1 3/2017 Shauh et al.
2018/0270722 A1* 9/2018 Kim .................. H04W 36/0072
2019/0357275 A1 11/2019 Tsai et al.

FOREIGN PATENT DOCUMENTS

WO WO-2016168155 A1 10/2016
WO WO-2016190952 A1 12/2016
WO WO-2020197695 A1 10/2020

OTHER PUBLICATIONS

International Search Report and Written Opinion—PCT/CN2021/123718—ISA/EPO—Jan. 13, 2022.
Supplementary European Search Report—EP21879466—Search Authority—Berlin—Oct. 30, 2024.
VIVO: “Draft new WID: Support for Multi-SIM devices in Rel-17”, 3GPP TSG RAN Meeting #86, RP-192546, Sitges, Spain, Dec. 9-12, 2019, 5 Pages, The whole document.
Qualcomm Incorporated: “Handling of Paging Collision for Multi-SIM”, 3GPP TSG-RAN WG2 Meeting #111-e, R2-2006944, Electronic, Aug. 17, 2020-Aug. 28, 2020, Aug. 7, 2020, pp. 1-4.

* cited by examiner

TECHNIQUES FOR ENHANCING PAGE SHARING USING A CHANNEL QUALITY-BASED MERGE CONDITION FOR DUAL-SUBSCRIPTION DEVICES

CROSS REFERENCES

The present Application is a 371 national stage filing of International PCT Application No. PCT/CN2021/123718 by XIE et al. entitled "TECHNIQUES FOR ENHANCING PAGE SHARING USING A CHANNEL QUALITY-BASED MERGE CONDITION FOR DUAL-SUBSCRIPTION DEVICES," filed Oct. 14, 2021; and claims priority to International Patent Application No PCT/CN2020/120812 by XIE et al. entitled "TECHNIQUES FOR ENHANCING PAGE SHARING USING A CHANNEL QUALITY-BASED MERGE CONDITION FOR DUAL-SUBSCRIPTION DEVICES," filed Oct. 14, 2020, each of which is assigned to the assignee hereof, and each of which is expressly incorporated by reference in its entirety herein.

FIELD OF DISCLOSURE

The present disclosure, for example, relates to wireless communications systems, including techniques for enhancing page sharing using a channel quality-based merge condition for dual-subscription devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may support multiple subscriptions (e.g., by using multiple subscriber identify module (SIM) cards) with which the UE may establish a connection with a serving cell. In some cases, the UE may support two subscriptions that belong to a same operator or that belong to different operators but share a same radio access network (RAN). In such cases, the UE may employ a mode of operation in which the UE performs idle mode measurements for one subscription via the other subscription, which may result in lower power costs and increased throughput. Such a mode of operation, however, may result in poor performance in some network conditions.

SUMMARY

The described techniques relate to improved methods, systems, devices, and apparatuses that support techniques for enhancing page sharing using a channel quality-based merge condition for dual-subscription devices. For example, a user equipment (UE) may support a first subscription as a default data subscription (DDS) and a second subscription as a non-DDS (nDDS) and, in examples in which the first subscription is in an active state and in which the second subscription is in an idle mode, the UE may employ a page sharing technique by using the first subscription to receive paging messages or perform various other idle mode measurements for the second subscription. The UE may employ such a page sharing technique in examples in which the first subscription and the second subscription are in a merged state, which may be referred to herein as a first mode of operation.

In some implementations of the present disclosure, the UE may condition continuation of or entrance into a merged state between the first subscription and the second subscription based on a channel quality-based merge condition. For example, the UE may exit the merged state or postpone entrance into the merged state based on a channel quality associated with a communication link between the UE and a serving cell to which the first subscription (e.g., the subscription in the active mode) has an established connection. In some examples, for instance, the UE may operate in the merged state (e.g., receive paging messages and perform various other idle mode measurements for the second subscription using the first subscription), measure the channel quality associated with the communication link between the UE and the serving cell, and exit the merged state (e.g., receive paging messages and perform various other idle mode measurements for the second subscription using the second subscription instead of the first subscription) if the measured channel quality fails to satisfy a threshold channel quality. In some other examples, the UE may determine that a criteria is satisfied for entering the merged state (e.g., a radio resource control (RRC) protocol of the UE may trigger an initiation of a merged state), measure the channel quality associated with the communication link between the UE and the serving cell, and postpone initiation into the merged state if the measured channel quality fails to satisfy a threshold channel quality.

In examples in which the UE exits or postpones the merged state between the first subscription and the second subscription based on the failure to satisfy the channel quality-based merge condition, the UE may initiate a timer and, while the timer is running, the UE may refrain from attempting to enter (or re-enter) into the merged state. As such, the UE may avoid a back-to-back merge-then-split scenario in which the UE may enter the merged state and subsequently exit the merged state in a relatively short amount of time, which may result in interrupted coverage and increased power consumption at the UE. If the first subscription establishes a connection with a new serving cell (e.g., a serving cell different than the serving cell to which the first subscription was initially connected to), however, the UE may terminate the timer and determine whether to enter (or re-enter) the merged state based on measuring a channel quality associated with a communication link between the UE and the new serving cell.

A method of wireless communication at a UE is described. The method may include identifying a first subscription of the UE is in an active mode with a first cell, identifying a second subscription of the UE is in an idle mode with a second cell, identifying a first mode of operation of the UE, where the first mode of operation includes using the first subscription to perform idle mode measurements for the second subscription, determining that a first channel quality associated with a first communication link between the UE and the first cell fails to satisfy a threshold channel quality, exiting the first mode of operation based on the failure to satisfy the threshold channel quality, and performing the idle mode measurements for the second subscription using the second subscription based on the UE exiting the first mode of operation.

An apparatus for wireless communication at a UE is described. The apparatus may include a processor, memory coupled with the processor, and instructions stored in the memory. The instructions may be executable by the processor to cause the apparatus to identify a first subscription of the UE is in an active mode with a first cell, identify a second subscription of the UE is in an idle mode with a second cell, identify a first mode of operation of the UE, where the first mode of operation includes using the first subscription to perform idle mode measurements for the second subscription, determine that a first channel quality associated with a first communication link between the UE and the first cell fails to satisfy a threshold channel quality, exit the first mode of operation based on the failure to satisfy the threshold channel quality, and perform the idle mode measurements for the second subscription using the second subscription based on the UE exiting the first mode of operation.

Another apparatus for wireless communication at a UE is described. The apparatus may include means for identifying a first subscription of the UE is in an active mode with a first cell, identifying a second subscription of the UE is in an idle mode with a second cell, identifying a first mode of operation of the UE, where the first mode of operation includes using the first subscription to perform idle mode measurements for the second subscription, determining that a first channel quality associated with a first communication link between the UE and the first cell fails to satisfy a threshold channel quality, exiting the first mode of operation based on the failure to satisfy the threshold channel quality, and performing the idle mode measurements for the second subscription using the second subscription based on the UE exiting the first mode of operation.

A non-transitory computer-readable medium storing code for wireless communication at a UE is described. The code may include instructions executable by a processor to identify a first subscription of the UE is in an active mode with a first cell, identify a second subscription of the UE is in an idle mode with a second cell, identify a first mode of operation of the UE, where the first mode of operation includes using the first subscription to perform idle mode measurements for the second subscription, determine that a first channel quality associated with a first communication link between the UE and the first cell fails to satisfy a threshold channel quality, exit the first mode of operation based on the failure to satisfy the threshold channel quality, and perform the idle mode measurements for the second subscription using the second subscription based on the UE exiting the first mode of operation.

Some examples of the method, apparatuses, and non-transitory computer-readable medium described herein may further include operations, features, means, or instructions for initiating a timer based on the UE exiting the first mode of operation, where the idle mode measurements for the second subscription may be performed using the second subscription during at least a duration of the timer.

Some examples of the method, apparatuses, and non-transitory computer-readable medium described herein may further include operations, features, means, or instructions for determining, during the duration of the timer, that the UE establishes a connection with a third cell using the first subscription, terminating the timer based on establishment of the connection with the third cell using the first subscription, determining whether a second channel quality associated with a second communication link between the UE and the third cell satisfies the threshold channel quality, and determining whether to re-enter the first mode of operation based on whether the second channel quality satisfies the threshold channel quality.

Some examples of the method, apparatuses, and non-transitory computer-readable medium described herein may further include operations, features, means, or instructions for determining that the timer expires, determining whether the first channel quality associated with the first communication link between the UE and the first cell satisfies the threshold channel quality, and determining whether to re-enter the first mode of operation based on whether the first channel quality satisfies the threshold channel quality.

In some examples of the method, apparatuses, and non-transitory computer-readable medium described herein, exiting the first mode of operation may include operations, features, means, or instructions for exiting the first mode of operation based on a radio resource control (RRC) protocol trigger, where the RRC protocol trigger may be activated based on the failure to satisfy the threshold channel quality.

Some examples of the method, apparatuses, and non-transitory computer-readable medium described herein may further include operations, features, means, or instructions for detecting a threshold quantity of consecutive cyclic redundancy check (CRC) failures associated with a data channel of the first communication link based on a paging radio network temporary identifier (P-RNTI), where the failure to satisfy the threshold channel quality is based on detecting the threshold quantity of consecutive CRC failures associated with the data channel.

In some examples of the method, apparatuses, and non-transitory computer-readable medium described herein, the failure to satisfy the threshold channel quality includes a failure to satisfy a channel quality-based merge condition associated with the first mode of operation.

In some examples of the method, apparatuses, and non-transitory computer-readable medium described herein, the first channel quality includes a reference signal received power (RSRP) or a signal-to-noise ratio (SNR).

In some examples of the method, apparatuses, and non-transitory computer-readable medium described herein, the first subscription may be a default data subscription (DDS) and the second subscription may be a non-DDS (nDDS).

A method of wireless communication at a UE is described. The method may include identifying a first subscription of the UE is in an active mode with a first cell, identifying a second subscription of the UE is in an idle mode with a second cell, determining that a criteria is satisfied for entering a first mode of operation where the UE uses the first subscription to perform idle mode measurements for the second subscription, determining that a first channel quality associated with a first communication link between the UE and the first cell fails to satisfy a threshold channel quality, and postponing initiation of the first mode of operation based on the failure to satisfy the threshold channel quality.

An apparatus for wireless communication at a UE is described. The apparatus may include a processor, memory coupled with the processor, and instructions stored in the memory. The instructions may be executable by the processor to cause the apparatus to identify a first subscription of the UE is in an active mode with a first cell, identify a second subscription of the UE is in an idle mode with a second cell, determine that a criteria is satisfied for entering a first mode of operation where the UE uses the first subscription to perform idle mode measurements for the second subscription, determine that a first channel quality associated with a first communication link between the UE and the first cell fails to satisfy a threshold channel quality, and postpone initiation of the first mode of operation based on the failure to satisfy the threshold channel quality.

Another apparatus for wireless communication at a UE is described. The apparatus may include means for identifying a first subscription of the UE is in an active mode with a first cell, identifying a second subscription of the UE is in an idle mode with a second cell, determining that a criteria is satisfied for entering a first mode of operation where the UE uses the first subscription to perform idle mode measurements for the second subscription, determining that a first channel quality associated with a first communication link between the UE and the first cell fails to satisfy a threshold channel quality, and postponing initiation of the first mode of operation based on the failure to satisfy the threshold channel quality.

A non-transitory computer-readable medium storing code for wireless communication at a UE is described. The code may include instructions executable by a processor to identify a first subscription of the UE is in an active mode with a first cell, identify a second subscription of the UE is in an idle mode with a second cell, determine that a criteria is satisfied for entering a first mode of operation where the UE uses the first subscription to perform idle mode measurements for the second subscription, determine that a first channel quality associated with a first communication link between the UE and the first cell fails to satisfy a threshold channel quality, and postpone initiation of the first mode of operation based on the failure to satisfy the threshold channel quality.

Some examples of the method, apparatuses, and non-transitory computer-readable medium described herein may further include operations, features, means, or instructions for initiating a timer based on the failure to satisfy the threshold channel quality, where the initiation of the first mode of operation may be postponed during at least a duration of the timer.

Some examples of the method, apparatuses, and non-transitory computer-readable medium described herein may further include operations, features, means, or instructions for identifying that the first subscription of the UE transitions to an idle mode with the first cell and initiating a cell re-selection and measurement for the first subscription.

Some examples of the method, apparatuses, and non-transitory computer-readable medium described herein may further include operations, features, means, or instructions for determining, during the duration of the timer, that the UE establishes a connection with a third cell using the first subscription, terminating the timer based on establishment of the connection with the third cell using the first subscription, determining whether a second channel quality associated with a second communication link between the UE and the third cell satisfies the threshold channel quality, and determining whether to initiate the first mode of operation based on whether the second channel quality satisfies the threshold channel quality.

Some examples of the method, apparatuses, and non-transitory computer-readable medium described herein may further include operations, features, means, or instructions for determining that the timer expires, determining whether the first channel quality associated with the first communication link between the UE and the first cell satisfies the threshold channel quality, and determining whether to initiate the first mode of operation based on whether the first channel quality satisfies the threshold channel quality.

Some examples of the method, apparatuses, and non-transitory computer-readable medium described herein may further include operations, features, means, or instructions for determining that the second subscription may be capable of the first mode of operation with the first subscription using the first cell, where determining that the criteria may be satisfied for entering the first mode of operation may be based on determining that the second subscription may be capable of the first mode of operation with the first subscription using the first cell.

In some examples of the method, apparatuses, and non-transitory computer-readable medium described herein, determining that the criteria may be satisfied for entering the first mode of operation may include operations, features, means, or instructions for determining that the initiation of the first mode of operation may have been triggered by an RRC protocol of the UE.

Some examples of the method, apparatuses, and non-transitory computer-readable medium described herein may further include operations, features, means, or instructions for detecting a threshold quantity of consecutive CRC failures associated with a data channel of the first communication link based on a P-RNTI, where the failure to satisfy the threshold channel quality is based on detecting the threshold quantity of consecutive CRC failures associated with the data channel.

In some examples of the method, apparatuses, and non-transitory computer-readable medium described herein, the failure to satisfy the threshold channel quality includes a failure to satisfy a channel quality-based merge condition associated with the first mode of operation.

In some examples of the method, apparatuses, and non-transitory computer-readable medium described herein, the first channel quality includes an RSRP or an SNR.

In some examples of the method, apparatuses, and non-transitory computer-readable medium described herein, the first subscription may be a DDS and the second subscription may be an nDDS.

DETAILED DESCRIPTION

Figure 1:
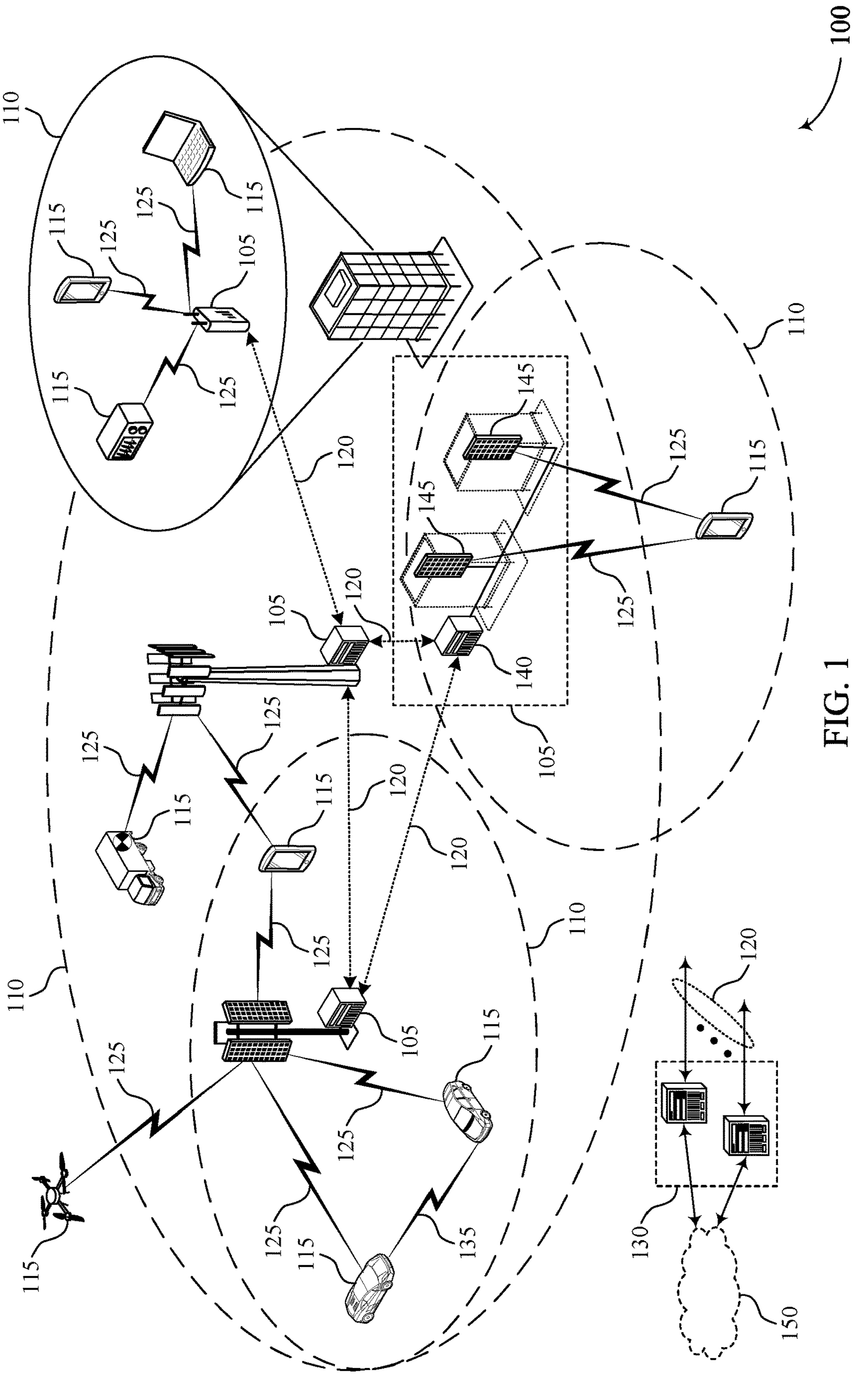
FIGS. 1 and 2 illustrate examples of wireless communications systems that support techniques for enhancing page sharing using a channel quality-based merge condition for dual-subscription devices in accordance with various aspects of the present disclosure.

In some wireless communications systems, a user equipment (UE) may be capable of supporting more than one subscription. Such a UE may be referred to as a dual-subscription device, and also as a dual subscriber identity module (SIM) device or a multi-SIM device. A dual-subscription UE may designate one subscription, such as a first subscription, as a default data subscription (DDS) and may designate another subscription, such as a second subscription, as a non-DDS (nDDS) and may operate the first subscription in an active mode and operate the second subscription in an idle mode. In some cases, the UE may initiate a merged state between the first subscription and the second subscription (e.g., to save power). In the merged state, the UE may use the first subscription, which may be connected to a first cell, to perform idle mode measurements (such as receive paging messages) for the second subscription, which may be connected to a second cell.

In some cases, such as in cases in which a channel quality between the UE and the first cell deteriorates, the use of the first subscription to perform the idle mode measurements for the second subscription may become sub-optimal. For example, in cases in which the channel quality between the UE and the first cell deteriorates, the UE may be unable to successfully receive paging messages for the second subscription using the first subscription and the first cell. Despite the greater likelihood for sub-optimal idle mode measurements for the second subscription in such poor channel quality scenarios, the UE may keep the first subscription and the second subscription in the merged state until a radio link failure (RLF) event triggers a split of the second subscription from the first subscription. The UE, however, may refrain from declaring RLF until after a threshold time duration during which the UE fails to receive a handover command from a base station and, as such, the second subscription may remain merged with the first subscription for that threshold time duration during which the channel quality is likely to be relatively poor. Accordingly, the first subscription may perform sub-optimal idle mode measurements for the second subscription for the threshold time duration (until the UE declares RLF).

In some implementations of the present disclosure, the UE may support a channel quality-based merge condition to initiate split of the second subscription from the first subscription prior to a declaration of RLF by the UE. For example, while the first subscription and the second subscription are in a merged state, the UE may perform one or more measurements of the channel quality of a communication link between the UE and the first cell (with which the UE may communicate using the first subscription) and may exit the merged state (e.g., split the second subscription from the first subscription) if the measured channel quality fails to satisfy a threshold channel quality. Similarly, if the first subscription and the second subscription are to enter a merged state, but have not already done so, the UE may measure the channel quality of the communication link between the UE and the first cell and may postpone the entrance of the first subscription and the second subscription into the merged state if the measured channel quality fails to satisfy the threshold channel quality. In some examples, the UE may set a timer for delaying any future attempts to enter the merged state based on determining that the measured channel quality fails to satisfy the threshold channel quality. In examples in which the first subscription establishes a connection with a different cell (e.g., a third cell), however, the UE may terminate the timer and perform a channel measurement for the different cell to determine whether to enter the merged state using the different cell.

Some implementations of the subject matter described in this disclosure can be implemented to realize one or more of the following potential advantages. In some implementations, the described techniques can provide for more optimal idle mode measurements, such as the reception of paging messages, for the second subscription in dual-subscription devices that support the use of a merged state. For example, based on implementing the described techniques, the UE may exit or postpone a merged state between the first subscription and the second subscription that will likely result in sub-optimal idle mode measurements for the second subscription based on the channel quality-based merge condition, which the UE may apply prior to a declaration of RLF. Accordingly, the UE may reduce the amount of time during which the second subscription may be affected by sub-optimal idle mode measurements due to being merged with the first subscription, or avoid such sub-optimal idle mode measurements for the second subscription altogether, which may result in more seamless coverage and communication for the second subscription. Further, the UE may avoid back-to-back merge-then-split scenarios in which the first subscription and the second subscription may oscillate between a merged state and a split state based on setting the timer for delaying future attempts to enter the merged state, which may also provide more seamless coverage while additionally improving power savings at the UE by way of potentially reducing a number of processing operations related to entering and exiting the merged state.

Aspects of the disclosure are initially described in the context of wireless communications systems. Aspects of the disclosure are additionally illustrated by and described with reference to processing timelines. Aspects of the disclosure are further illustrated by and described with reference to apparatus diagrams, system diagrams, and flowcharts that relate to techniques for enhancing page sharing using a channel quality-based merge condition for dual-subscription devices.

FIG. 1 illustrates an example of a wireless communications system 100 that supports techniques for enhancing page sharing using a channel quality-based merge condition for dual-subscription devices in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115, UE-specific search space sets for sending control information to a specific UE 115, paging search spaces, or any combination thereof.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). In some aspects, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may be capable of supporting multiple subscriptions with multiple SIM cards and, as such, may be referred to as a multi-SIM device. For example, the UE 115 may support a first subscription of a first SIM and a second subscription of a second SIM. In such examples, the UE 115 may be referred to as a dual-subscription device or a dual-SIM device. In some aspects, the first subscription, which may be connected to a first cell, may be in an active mode (or an active state) and the second subscription, which may be connected to a second cell, may be in an idle mode (or an idle state). In some cases, the UE 115 may achieve power savings and throughput gain by initiating a merged state in which the UE 115 may use the first subscription to perform idle mode measurements (such as receive paging messages) for the second subscription using the first cell. In some aspects, the UE 115 may initiate the merged state including the first subscription and the second subscription if the corresponding SIMs (the first SIM and the second SIM) belong to the same operator. Alternatively, the UE 115 may initiate the merged state including the first subscription and the second subscription if the corresponding SIMs (the first SIM and the second SIM) belong to different operators but share a radio access network (RAN). Such a merged state including the first subscription and the second subscription may achieve greater power gain as well as increased throughput such that the UE 115 may achieve the multi-SIM throughput key performance indicator (KPI).

In some implementations of the present disclosure, the UE 115 may condition the continuation or the initiation, or both, of the merged state between the first subscription and the second subscription based on a channel quality-based merge condition. For example, the UE 115 may condition whether the UE 115 continues or initiates the merged state between the first subscription and the second subscription based on whether a channel quality associated with a communication link 135 between the UE 115 and the first cell (e.g., a base station 105) satisfies a threshold channel quality. In examples in which the UE 115 determines that the channel quality associated with the communication link 135 fails to satisfy the threshold channel quality while the first subscription and the second subscription are in the merged state, the UE 115 may exit the merged state (e.g., split the second subscription from the first subscription) and begin using the second subscription and the second cell to perform the idle mode measurements for the second subscription (as opposed to using the first subscription and the first cell). Alternatively, in examples in which the UE 115 determines that the channel quality associated with the communication link 135 fails to satisfy the threshold channel quality prior to initiating the merged state between the first subscription and the second subscription, the UE 115 may postpone or otherwise delay the merged state and continue using the second subscription and the second cell to perform the idle mode measurements for the second subscription.

Figure 2:
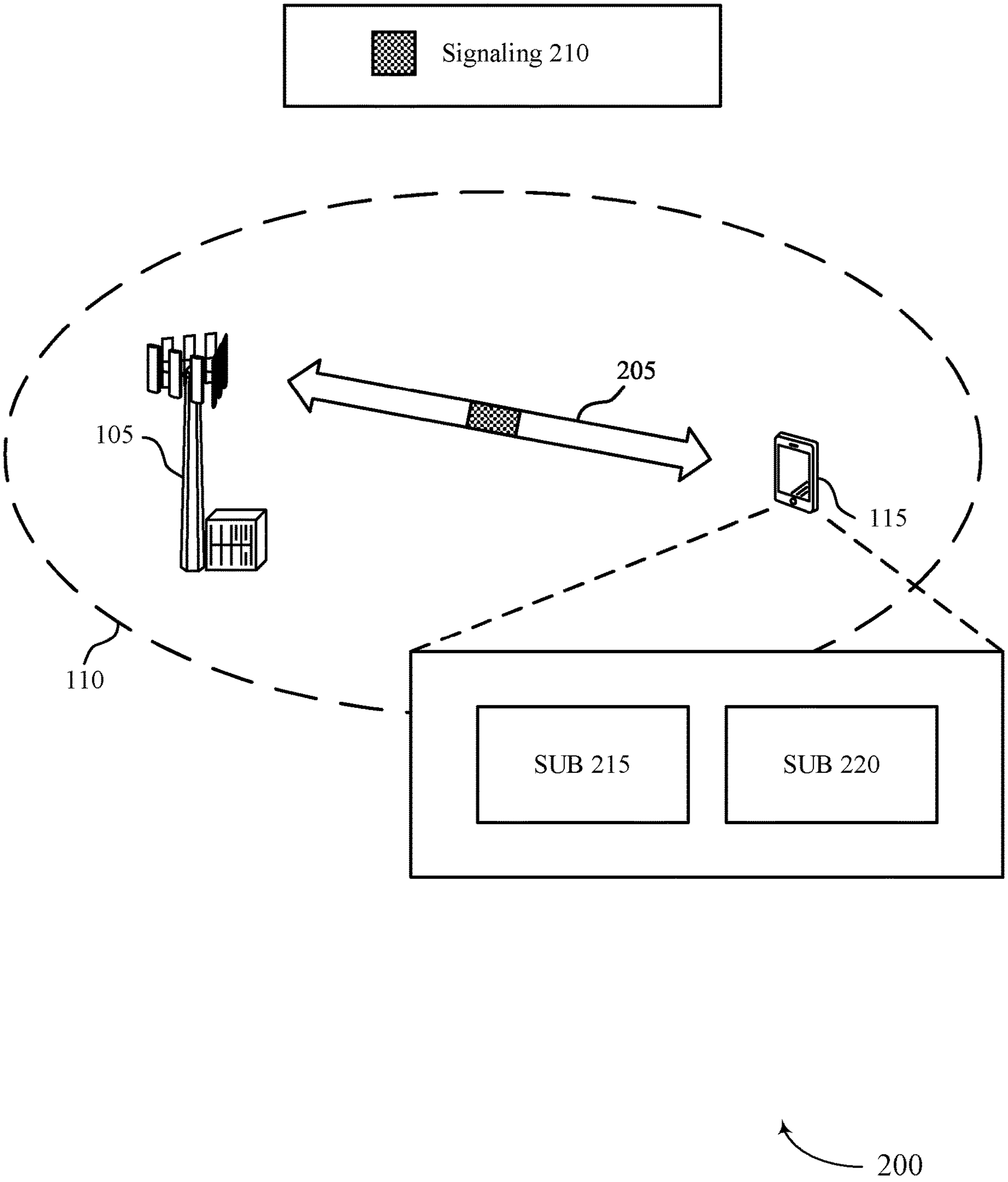

FIG. 2 illustrates an example of a wireless communications system 200 that supports techniques for enhancing page sharing using a channel quality-based merge condition for dual-subscription devices in accordance with various aspects of the present disclosure. In some examples, the wireless communications system 200 may implement aspects of the wireless communication system 100. The wireless communications system 200 may include a base station 105 that may communicate with a UE 115 within a geographic coverage area 110 associated with the base station 105. In some examples, the UE 115 may be a multi-SIM device, such as a dual-SIM device or a dual-subscription device, and may support multiple subscriptions. For example, the UE 115 may support a subscription 215 (i.e., a SUB 215 or a first subscription, which may function as a DDS) and a subscription 220 (i.e., a SUB 220 or a second subscription, which may function as an nDDS). In some implementations, the UE 115 may condition the continuation or the initiation of a merged state between the subscription 215 and the subscription 220 based on a channel quality-based merge condition.

In some aspects, the base station 105 may support multiple serving cells. For example, the base station 105 may support a first cell to which the UE 115 may communicate using the subscription 215 and a second cell to which the UE 115 may communicate using the subscription 220. Alternatively, the base station 105 may support a single serving cell, such as one of the first cell to which the subscription 215 may establish a connection or the second cell to which the subscription 220 may establish a connection, while the other of the first cell or the second cell may be supported by a different base station 105. In some examples, the first cell and the second cell, whether both supported by the base station 105 or supported by the base station 105 and the different base station 105, may belong to the same operator or may belong to different operators but with shared RANs. In such examples, the UE 115 may initiate a merged state between the subscription 215 and the subscription 220 (provided that the subscription 215 and the subscription 220 are capable of camping on the same serving cell).

For example, the subscription 215 of the UE 115 may be in an active mode, such as an RRC active state, with the first cell and the subscription 220 of the UE 115 may be in an idle mode, such as in an RRC idle state, with the second cell and the UE 115, based on entering the merged state including the subscription 215 and the subscription 220, may perform idle mode measurements, such as receive paging messages, for the subscription 220 using the subscription 215 and the first cell. For example, if the subscription 215 remains in the active mode (e.g., a connected mode), the UE 115 may use the subscription 215 to receive and decode a page for the subscription 220. In such a merged state, the subscription 215 and the subscription 220 may effectively camp on the same cell such that one protocol stack (e.g., an LTE protocol stack) can be used for the subscription 215 and the subscription 220, which may be likely in some network deployments (such as in China Mobile (CMCC) deployments). In such examples in which the UE 115 initiates the merged state between the subscription 215 and the subscription 220, the UE 115 may achieve a power gain (e.g., a lower power cost) or a throughput gain, or both, such that the UE 115 may achieve a multi-SIM throughput KPI.

In some cases, however, such as in cases in which channel conditions between the UE 115 and the base station 105 deteriorate, such a merged state may result in sub-optimal performance of the idle mode measurements for the subscription 220. For example, a channel quality associated with a communication link 205 over which the UE 115 and the base station 105 (e.g., the first cell) may exchange signaling 210 may deteriorate (e.g., based on high interference or obstruction, among other examples), which may result in a lower likelihood for the UE 115 to receive paging messages or perform various other idle mode measurements for the subscription 220 using the subscription 215 and the first cell. In some aspects, the lower likelihood for the UE 115 to receive paging messages or perform the various other idle mode measurements for the subscription 220 using the subscription 215 may adversely affect one or more KPIs of the subscription 220.

In cases in which the channel conditions associated with the communication link 205 deteriorate, the UE 115 may transmit one or more measurement reports to the base station 105 and, in scenarios of good network deployment, the base station 105 may initiate a handover of the UE 115 to a different serving cell to avoid RLF. In some scenarios, however, such as in scenarios of poor network deployment or poor network planning, the base station 105 may fail to transmit a handover command to the UE 115 in response to the one or more measurement reports from the UE 115. In such scenarios, if the UE 115 fails to receive a handover command from the base station 105 for a threshold time duration, the UE 115 may declare RLF for the subscription 215 (e.g., the active or connected subscription).

Upon declaring RLF for the subscription 215, the UE 115, using the subscription 215, may attempt to camp to a different cell (e.g., as in single-SIM devices) and may set a hysterias timer to avoid immediate split and back-to-back split-then-merge. However, in cases of poor network planning, the UE 115, for example, may be within a sub-optimally planned China Telecom (CT) and China Unicom (CU) RAN sharing region such that the subscription 220 may be trapped on a poor CT cell with no other, better CT cells nearby (e.g., no other, better CT cells having a coverage area 110 including the UE 115). In some cases, such a sub-optimally planned CT+CU RAN sharing region may be associated with worse network conditions or connectivity than cases in which there are no RAN sharing CT+CU with out-of-service (OOS) seen for both the subscription 215 and the subscription 220. Additionally or alternatively, upon declaration of RLF, the subscription 215 may remain in the active mode (e.g., the connected mode) in a 4Rx configuration (e.g., a 4×4 MIMO configuration), which may be unsuitable for idle camping in a 2Rx configuration (e.g., a 2×2 MIMO configuration). As such, OOS may be seen (e.g., may result) when the subscription 215 changes from the active mode to an idle mode.

Despite the poor channel conditions of the communication link 205 between the UE 115 and the first cell using the subscription 215, the subscription 220 may remain in the merged state with the subscription 215 until RLF is declared. As such, the subscription 220 may end up in a poor connectivity scenario with a lack of readily available or nearby cells that may offer improved connectivity upon declaration of RLF for the subscription 215, even if there were better cells to which the subscription 220 may have connected prior to the declaration of RLF. For example, if the subscription 215 and the subscription 220 share a RAN (in which cases the subscription 215 and the subscription 220 may or may not belong to the same operator), the subscription 220 may remain merged with the subscription 215 (which may be connected to a relatively poor cell) prior to RLF due to poor network planning of the operator of the subscription 215, even if there are relatively better cells to which the subscription 220 may establish a connection with. As such, the UE 115 may provide more seamless idle mode measurement for the subscription 220 if the UE 115 exits the merged state between the subscription 215 and the subscription 220 prior to declaring RLF for the communication link 205 over which the UE 115 may communicate with the base station 105 using the subscription 215.

Accordingly, in some implementations of the present disclosure, the UE 115 may employ a channel quality-based merge condition by measuring a channel quality of the communication link 205 over which the UE 115 may communicate with the base station 105 (e.g., the first cell) using the subscription 215 and determining whether the measured channel quality satisfies a threshold link quality. In some examples, for instance, the subscription 215 and the subscription 220 may be in a merged state in which the UE 115 may use the subscription 215 and the first cell (to which the subscription 215 is connected) to perform the idle mode measurements for the subscription 220 and, in examples in which the UE 115 determines that the measured channel quality fails to satisfy the threshold channel quality, the UE 115 may exit the merged state. Accordingly, the subscription 220 may split from the subscription 215 and the UE 115 may perform the idle mode measurements for the subscription 220 using the subscription 220. Additional details relating to exiting a merged state based on determining that the channel quality associated with the communication link 205 fails to satisfy the threshold channel quality are described herein, including with reference to FIG. 3.

Similarly, the subscription 215 and the subscription 220 may initially be in a split state (e.g., not in a merged state), and the UE 115 may determine to postpone or otherwise delay initiation of a merged state between the subscription 215 and the subscription 220 if the UE 115 determines that the measured channel quality fails to satisfy the threshold channel quality. Additional details relating to postponing or delaying the initiation of the merged state between the subscription 215 and the subscription 220 based on determining that the channel quality associated with the communication link 205 fails to satisfy the threshold channel quality are described herein, including with reference to FIG. 4.

Figure 3:
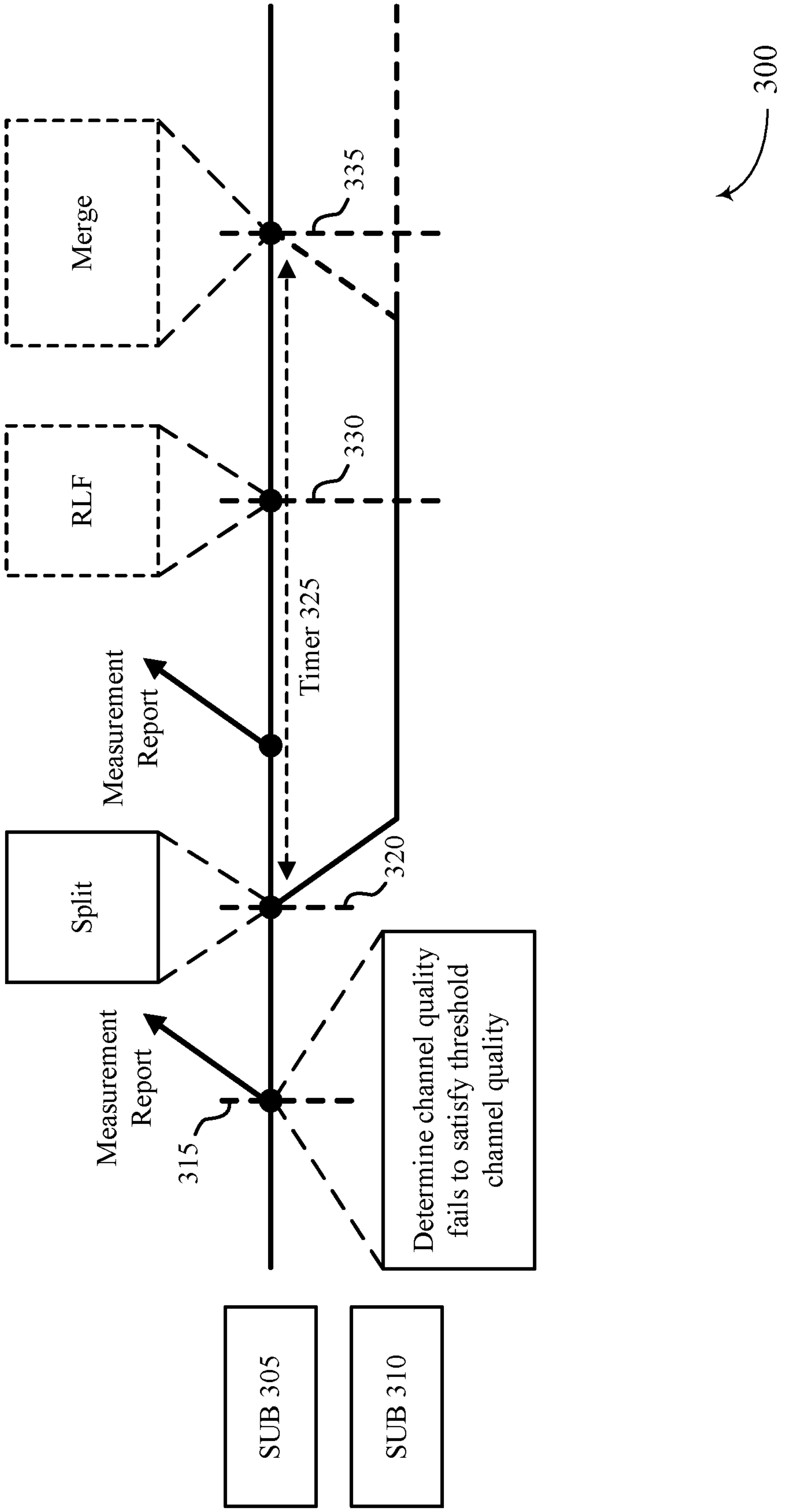
FIG. 3 illustrates an example of a processing timeline that supports techniques for enhancing page sharing using a channel quality-based merge condition for dual-subscription devices in accordance with various aspects of the present disclosure.

FIG. 3 illustrates an example of a processing timeline 300 that supports techniques for enhancing page sharing using a channel quality-based merge condition for dual-subscription devices in accordance with various aspects of the present disclosure. In some examples, the processing timeline 300 may be implemented by a UE 115 to realize aspects of the wireless communications system 100 or the wireless communications system 200. For example, a UE 115 may support a subscription 305 (i.e., a SUB 305 or a first subscription, which may function as a DDS) that is connected to a first cell in an active mode or in an idle mode and a subscription 310 (i.e., a SUB 310 or a second subscription, which may function as an nDDS) that is connected to a second cell in an idle mode. The subscription 305 and the subscription 310 may be in a merged state and, in some implementations, the UE 115 may determine to exit the merged state (e.g., split the subscription 310 from the subscription 305) based on determining that a channel quality associated with a communication link between the UE 115 and the first cell fails to satisfy a threshold channel quality associated with the channel quality-based merge condition.

For example, the subscription 305 and the subscription 310 may initially be in a merged state in which the UE 115 may perform the idle mode measurements for the subscription 310 using the subscription 305 and the first cell. In such examples, the subscription 305 and the subscription 310 may be capable of camping on the same cell. For example, the subscription 305 and the subscription 310 may be capable of communicating using the same radio frequency spectrum bands. In some implementations of the present disclosure, the UE 115 may initiate a layer 1 (L1) channel measurement of the channel quality associated with the communication link between the UE 115 and the first cell. The UE 115 may initiate the L1 measurement of the channel quality periodically or based on based on or more triggering conditions. In some aspects, the UE 115 may measure the channel quality associated with the communication link between the UE 115 and the first cell and compare the measured channel quality to the threshold channel quality while the subscription 305 is in an active mode or in an idle mode (e.g., the UE 115 may determine whether to continue the merged state or to split from the merged state in examples in which both subscriptions are in an idle mode or in examples in which the subscription 305 is in an active mode while the subscription 310 is in an idle mode).

At 315, for example, the UE 115 may measure the channel quality associated with the communication link between the UE 115 and the first cell and may determine that the channel quality fails to satisfy the threshold channel quality. In examples in which the UE 115 determines that the channel quality fails to satisfy the threshold channel quality, the UE 115 may determine that the UE 115 may be unlikely to receive a handover command from the base station responsive to one or more measurement reports transmitted from the UE 115 using the subscription 305 (e.g., the active or connected subscription) and, accordingly, may determine that RLF is likely. Further, although illustrated as occurring simultaneously with the determination that the channel quality fails to satisfy the threshold channel quality, the UE 115 may begin transmitting the one or more measurement reports using the subscription 305 before or after determining that the channel quality fails to satisfy the threshold channel quality.

In some examples, the UE 115 may determine that the channel quality fails to satisfy the threshold channel quality based on performing an L1 channel measurement, such as measuring a filtered reference signal received power (RSRP) or a filtered signal-to-noise ratio (SNR) (e.g., a frequency tracking loop (FTL) SNR), or both. In examples in which the UE 115 measures a filtered RSRP, the UE 115 may determine that the channel quality fails to satisfy the threshold channel quality based on determining that the filtered RSRP is lower than a threshold filtered RSRP value or metric (such as a Thresh_RSRP value) for a first threshold in time (TTT), which may be referred to as TTT1. For example, the UE 115 may set the TTT1 equal to 640 ms and may set the Thresh_RSRP value equal to −105 dBm such that if the UE 115 measures a filtered RSRP less than −105 dBm for 640 ms, the UE 115 may determine that the channel quality fails to satisfy the threshold channel quality.

Additionally or alternatively, the UE 115 may measure a filtered SNR and may determine that the channel quality fails to satisfy the threshold channel quality based on determining that the filtered SNR is lower than a threshold filtered SNR value or metric (such as a Thresh_SNR value)

for a second TTT, which may be referred to as TTT2. For example, the UE 115 may set the TTT2 equal to 640 ms and may set the Thresh_SNR value equal to −3 dB or to 0 dB such that if the UE 115 measures a filtered SNR less than −3 dB or less than 0 dB for 640 ms, the UE 115 may determine that the channel quality fails to satisfy the threshold channel quality. In some aspects, the UE 115 may determine a filtered FTL SNR based on determining a maximum of FTL SNR on RX0/1/2/3, which may be denoted by the mathematical expression FTL SNR=max{FTL SNR on RX0/1/2/3}.

Additionally or alternatively, the UE 115 may determine that the channel quality fails to satisfy the threshold channel quality based on continuous or persistent decoding failures. For example, the UE 115 may attempt to decode and perform a CRC on a data channel, such as a physical downlink shared channel (PDSCH), and if the UE 115 continuously or persistently fails a CRC for the data channel, the UE 115 may determine that the channel quality fails to satisfy the threshold channel quality. Such consistent or persistent CRC failure may include or refer to CRC failures exceeding a threshold count or CRC failures occurring at greater than a threshold frequency, or both. In some aspects, the UE 115 may attempt to perform a CRC on a PDSCH using a radio network temporary identifier (RNTI), such as a paging RNTI (P-RNTI). In such aspects, the UE 115 may determine that the channel quality fails to satisfy the threshold channel quality if the UE 115 detects a quantity of consecutive CRC failures for the PDSCH using the P-RNTI that exceed a threshold quantity. For example, the UE 115 may determine that the channel quality fails to satisfy the threshold channel quality if the UE 115 detects a quantity of N (or more) consecutive CRC failures for the PDSCH using the P-RNTI.

As such, the UE 115 may determine that the channel quality fails to satisfy the threshold channel quality if the UE 115 determines that the RSRP or the SNR falls below a corresponding threshold value or that the UE 115 has experienced a threshold quantity of continuous P-RNTI PDSCH CRC failures, or any combination thereof. In examples in which the UE 115 determines that the channel quality fails to satisfy the threshold channel quality, the L1 of the UE 115 may indicate, to an RRC protocol of the UE 115, that a condition (i.e., a channel quality-based merge condition) for splitting from the merged state is satisfied.

Accordingly, at 320, the UE 115 may exit the merged state based on the failure to satisfy the threshold channel quality. In some examples, the RRC protocol of the UE 115 may trigger the exit from the merged state based on receiving the indication that the condition for splitting from the merged state is satisfied from the L1 of the UE 115. Further, although shown as occurring at separate instances on the processing timeline 300, the UE 115 may determine that the channel quality fails to satisfy the threshold channel quality at 315 and split the subscription 310 from the subscription 305 at approximately the same time. For example, the RRC protocol of the UE 115 may trigger the split shown at 320 immediately after the determination that the channel quality fails to satisfy the threshold channel quality at 315.

In some examples, the UE 115 may additionally initiate (i.e., start) a timer 325 based on the UE exiting from the merged state at 320. In some aspects, the UE 115 may initiate the timer 325, which may be referred to as a hysterias timer, such as T_hyst_merge or T_hyst_split, to postpone or otherwise delay any future attempts to re-enter the merged state. In other words, the UE 115 may refrain from attempting to re-enter the merged state prior to the expiration or termination of the timer 325. In some aspects, the timer 325 may be equal to 1 second.

At 330, the UE 115 may, in some implementations, determine that a threshold time duration during which the UE 115 transmitted one or more measurement reports to the base station 105 using the subscription 305 without receiving a handover command from the base station responsive to the one or more measurement reports has passed and, as such, the UE 115 may declare RLF for the subscription 305. Accordingly, the subscription 305 may end its connection with the first cell and attempt to reconnect to another serving cell. Although shown as potentially occurring prior to 335, at which point the UE 115 may determine whether to re-enter the merged state, the UE 115 may alternatively declare RLF after 335 or may refrain from declaring RLF (e.g., channel conditions may improve or the UE 115 may receive a handover command prior to 330). Further, based on implementing the techniques described herein, the UE 115 may declare RLF for the subscription 305 without adversely affecting the subscription 310 (e.g., the subscription 310 may have previously split from the subscription 305 based on the channel quality-based merge condition).

At 335, the UE 115 may determine that the timer 325 expires or may terminate the timer 325. In examples in which the UE 115 terminates the timer 325, the UE 115 may determine that the UE 115 establishes a connection with a third cell (e.g., a new cell) using the subscription 305 and may terminate the timer 325 based on determining that the UE 115 has established the connection with the third cell using the subscription 305. In such examples, the UE 115 may measure a channel quality associated with a communication link between the UE 115 and the third cell. Alternatively, the UE 115 may determine that the timer 325 expires at 330. If the UE 115 determines that the timer 325 expires, the UE 115 may measure (e.g., re-measure) the channel quality associated with the communication link between the UE 115 and the first cell. In either examples (e.g., regardless of whether the UE 115 terminates the timer 325 or determines that the timer 325 expires), the UE 115 may determine whether the measured (or re-measured) channel quality satisfies the threshold channel quality.

Likewise, the UE 115 may determine whether to re-enter the merged state based on determining whether the measured channel quality satisfies the threshold channel quality. For instance, in examples in which the UE 115 determines that the measured channel quality satisfies the threshold channel quality, the UE 115 may determine to re-enter the merged state. Alternatively, in examples in which the UE 115 determines that the measured channel quality fails to satisfy the threshold channel quality, the UE 115 may refrain from re-entering the merged state (e.g., the subscription 305 and the subscription 310 may remain in a split state past 335). Additional details relating to how the UE 115 may employ the channel quality-based merge condition after determining that a criteria (e.g., a termination or expiration of the timer 325, an RRC protocol trigger, etc.) is satisfied for entering or re-entering the merged state are described herein, including with reference to FIG. 4.

Figure 4:
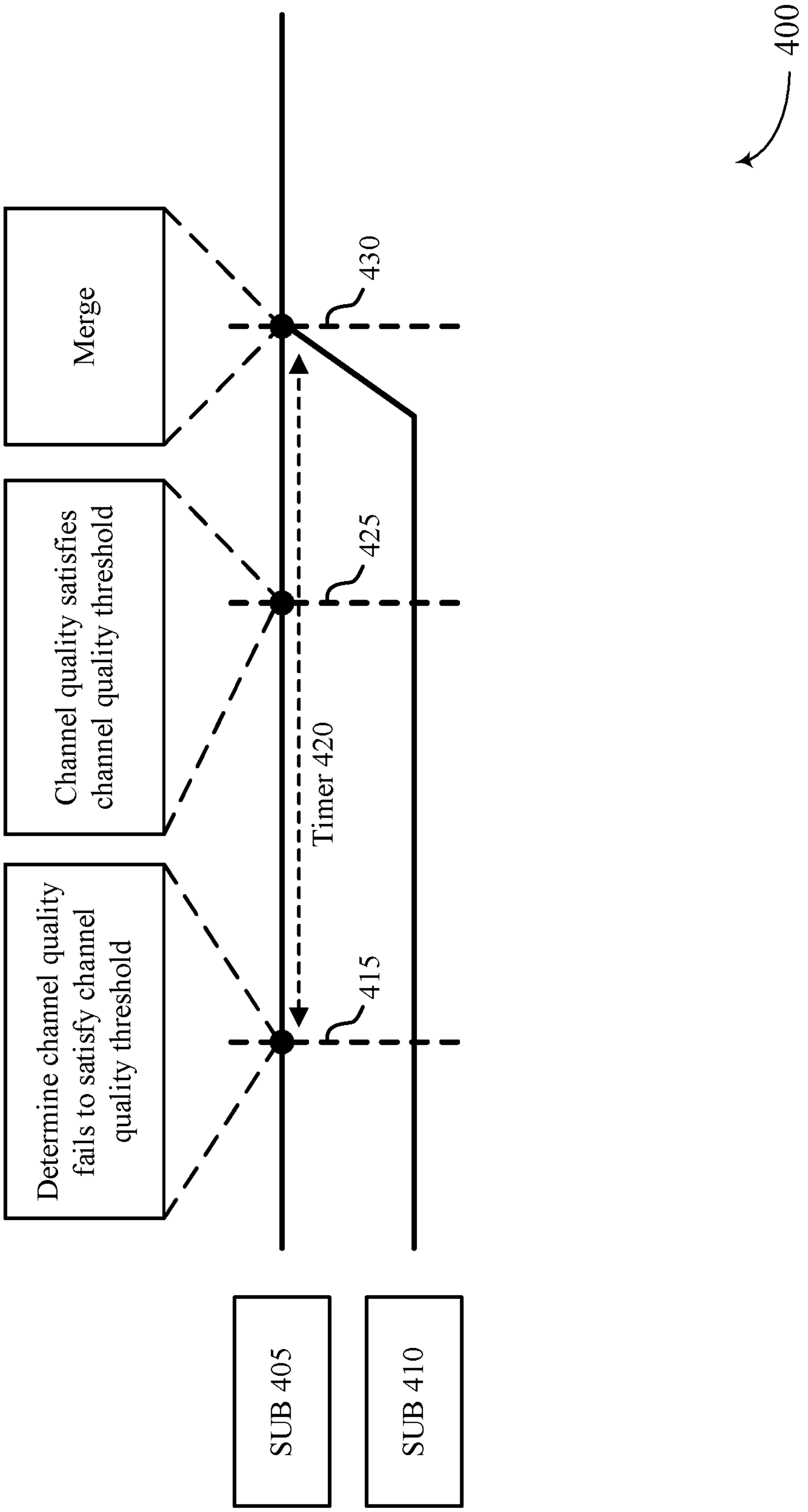
FIG. 4 illustrates an example of a processing timeline that supports techniques for enhancing page sharing using a channel quality-based merge condition for dual-subscription devices in accordance with various aspects of the present disclosure.

FIG. 4 illustrates an example of a processing timeline 400 that supports techniques for enhancing page sharing using a channel quality-based merge condition for dual-subscription devices in accordance with various aspects of the present disclosure. In some examples, the processing timeline 400 may be implemented by a UE 115 to realize aspects of the wireless communications system 100 or the wireless communications system 200. For example, a UE 115 may support a subscription 405 (i.e., a SUB 405 or a first subscription, which may function as a DDS) that is connected to a first cell in an active mode or an idle mode and a subscription 410 (i.e., a SUB 410 or a second subscription, which may function as an nDDS) that is connected to a second cell in an idle mode. In some aspects, the subscription 405 and the subscription 410 may in a split state (e.g., not a merged state), the UE 115 may determine that a criteria is satisfied for entering a merged state, and the UE 115 may determine whether to enter the merged state or to delay initiation of the merged state based on determining whether a channel quality associated with a communication link between the UE 115 and the first cell satisfies a threshold channel quality associated with the channel quality-based merge condition. In some aspects, the threshold channel quality for delaying initiation of the merged state may be the same as the threshold channel quality for exiting the merged state.

For example, the subscription 405 and the subscription 410 may initially be in a split state in which the UE 115 may perform idle mode measurements for the subscription 410 using the subscription 410 and the second cell. In some cases, the UE 115 may determine that a criteria is satisfied for entering the merged state in which the UE 115 may perform the idle mode measurements for the subscription 410 using the subscription 405 and the first cell, where such a criteria may include a capability of the subscription 410 to camp on the first cell with the subscription 405, an RRC protocol trigger to merge (e.g., an RRC triggered force merge), or the expiration or termination of a timer T_hyst_merge (such as the timer 325, as shown in FIG. 3). In some implementations of the present disclosure, the UE 115 may initiate an L1 channel measurement of the channel quality associated with the communication link between the UE 115 and the first cell based on determining that the criteria for entering the merged state is satisfied. For example, the RRC protocol of the UE 115 may call on an L1 application programming interface (API) to check the current serving cell's channel quality.

At 415, for example, the UE 115 may measure the channel quality associated with the communication link between the UE 115 and the first cell and, in some cases, may determine that the channel quality fails to satisfy the threshold channel quality. In some examples, the UE 115 may determine that the channel quality fails to satisfy the threshold channel quality based on performing an L1 channel measurement, such as measuring a filtered RSRP or a filtered SNR (e.g., an FTL SNR), or both. In some aspects, the UE 115 may measure the channel quality associated with the communication link between the UE 115 and the first cell and compare the measured channel quality to the threshold channel quality while the subscription 405 is in an active mode or in an idle mode (e.g., the UE 115 may determine whether to enter the merged state or to delay entrance into the merged state in examples in which both subscriptions are in an idle mode or in examples in which the subscription 405 is in an active mode while the subscription 410 is in an idle mode).

In examples in which the UE 115 measures a filtered RSRP, the UE 115 may determine that the channel quality fails to satisfy the threshold channel quality based on determining that the filtered RSRP is lower than a threshold filtered RSRP value or metric (such as a Thresh_RSRP value) for a first TTT, which may be referred to as TTT1. For example, the UE 115 may set the TTT1 equal to 640 ms and may set the Thresh_RSRP value equal to −105 dBm such that if the UE 115 measures a filtered RSRP less than −105 dBm for 640 ms, the UE 115 may determine that the channel quality fails to satisfy the threshold channel quality.

Additionally or alternatively, the UE 115 may measure a filtered SNR and may determine that the channel quality fails to satisfy the threshold channel quality based on determining that the filtered SNR is lower than a threshold filtered SNR value or metric (such as a Thresh_SNR value) for a second TTT, which may be referred to as TTT2. For example, the UE 115 may set the TTT2 equal to 640 ms and may set the Thresh_SNR value equal to −3 dB such that if the UE 115 measures a filtered SNR less than −3 dB for 640 ms, the UE 115 may determine that the channel quality fails to satisfy the threshold channel quality. In some aspects, the UE 115 may determine a filtered FTL SNR based on determining a maximum of FTL SNR on RX0/1/2/3, which may be denoted by the mathematical expression FTL SNR=max{FTL SNR on RX0/1/2/3}.

Additionally or alternatively, the UE 115 may determine that the channel quality fails to satisfy the threshold channel quality based on continuous or persistent decoding failures. For example, the UE 115 may attempt to decode and perform a CRC on a data channel, such as a PDSCH, and if the UE 115 continuously or persistently fails a CRC for the data channel, the UE 115 may determine that the channel quality fails to satisfy the threshold channel quality. Such consistent or persistent CRC failure may include or refer to CRC failures exceeding a threshold count or CRC failures occurring at greater than a threshold frequency, or both. In some aspects, the UE 115 may attempt to perform a CRC on a PDSCH using an RNTI, such as a P-RNTI. In such aspects, the UE 115 may determine that the channel quality fails to satisfy the threshold channel quality if the UE 115 detects a quantity of consecutive CRC failures for the PDSCH using the P-RNTI that exceed a threshold quantity. For example, the UE 115 may determine that the channel quality fails to satisfy the threshold channel quality if the UE 115 detects a quantity of N (or more) consecutive CRC failures for the PDSCH using the P-RNTI.

As such, the UE 115 may determine that the channel quality fails to satisfy the threshold channel quality if the UE 115 determines that the RSRP or the SNR falls below a corresponding threshold value or that the UE 115 has experienced a threshold quantity of continuous P-RNTI PDSCH CRC failures, or any combination thereof. In examples in which the UE 115 determines that the channel quality fails to satisfy the threshold channel quality, the L1 of the UE 115 may indicate, to an RRC protocol of the UE 115, that a condition (i.e., a channel quality-based merge condition) for postponing the initiation of the merged state is satisfied. In some examples, the RRC protocol may initiate (i.e., start) a timer 420, which may be referred to as a hysterias timer, such as T_hyst_merge or T_hyst_split, based on determining that the condition for postponing the initiation of the merged state is satisfied. In such examples, the UE 115 may refrain from attempting to enter the merged state prior to the expiration or termination of the timer 420. In some aspects, the timer 420 may be equal to 1 second. In some aspects, if the DDS (e.g., the subscription 405) is in an idle state or mode while the timer 420 is running (e.g., prior to a force merge associated with the expiration of the timer 420), the UE 115 may trigger DDS cell re-selection search and measurement. In such aspects, the UE 115 may search for and measure (e.g., measure reference signals) associated with one or more other cells (e.g., neighbor cells) and, in some scenarios, may attempt to establish a connection with a measured cell for the DDS (e.g., if that measured cell is associated with a threshold channel quality).

At 425, in some aspects, the channel quality associated with a communication link between the UE 115 and a serving cell may improve such that the channel quality satisfies the threshold channel quality while the timer 420 is running. For instance, in some examples, the UE 115 may remain connected to the first cell and the channel quality associated with the communication link between the UE 115 and the first cell may improve over time such that, at 425, the channel quality becomes great enough to satisfy the threshold channel quality associated with the channel quality-based merge condition. In some other examples, the UE 115 may establish a connection with a third cell (e.g., a new cell) using the subscription 405 and a channel quality of a communication link between the UE 115 and the third cell may satisfy the threshold channel quality.

At 430, the UE 115 may determine that the timer 420 expires or may terminate the timer 420. For example, the UE 115 may terminate the timer 420 based on determining that the UE 115 establishes the connection with the third cell. In such examples, the UE 115 may measure the channel quality associated with the communication link between the UE 115 and the third cell. Alternatively, in examples in which the UE 115 remains connected to the first cell, the UE 115 may determine that the timer 420 expires and, based on determining that the timer 420 expires, the UE 115 may measure (e.g., re-measure) the channel quality associated with the communication link between the UE 115 and the first cell upon expiration of the timer 420. In either examples (e.g., regardless of whether the UE 115 terminates the timer 420 or determines that the timer 420 expires), the UE 115 may determine whether the measured (or re-measured) channel quality satisfies the threshold channel quality (and may check a corresponding force merge condition).

Likewise, the UE 115 may determine whether to enter the merged state based on determining whether the measured channel quality satisfies the threshold channel quality. For instance, in examples in which the UE 115 determines that the measured channel quality fails to satisfy the threshold channel quality, the UE 115 may refrain from entering the merged state at 430 (e.g., the subscription 405 and the subscription 410 may remain in a split state past 430). Alternatively, in examples in which the UE 115 determines that the measured channel quality satisfies the threshold channel quality (e.g., determines that both an RSRP measurement and an SNR measurement satisfy respective threshold channel qualities), as shown in FIG. 4, the UE 115 may check an S-criteria of the subscription 405 for the subscription 410 and determine whether the subscription 410 is capable of camping on the serving cell to which the UE 115 is connected using the subscription 405 (e.g., if the subscription 405 and the subscription 410 can communicate over the same radio frequency spectrum band or are capable of supporting the same radio frequency spectrum bands). If the UE 115 determines that the S-criteria passes and that the subscription 410 is capable of camping on the serving cell, the RRC protocol of the UE 115 may trigger entrance into the merged state (e.g., may trigger a force merge).

Figure 5:
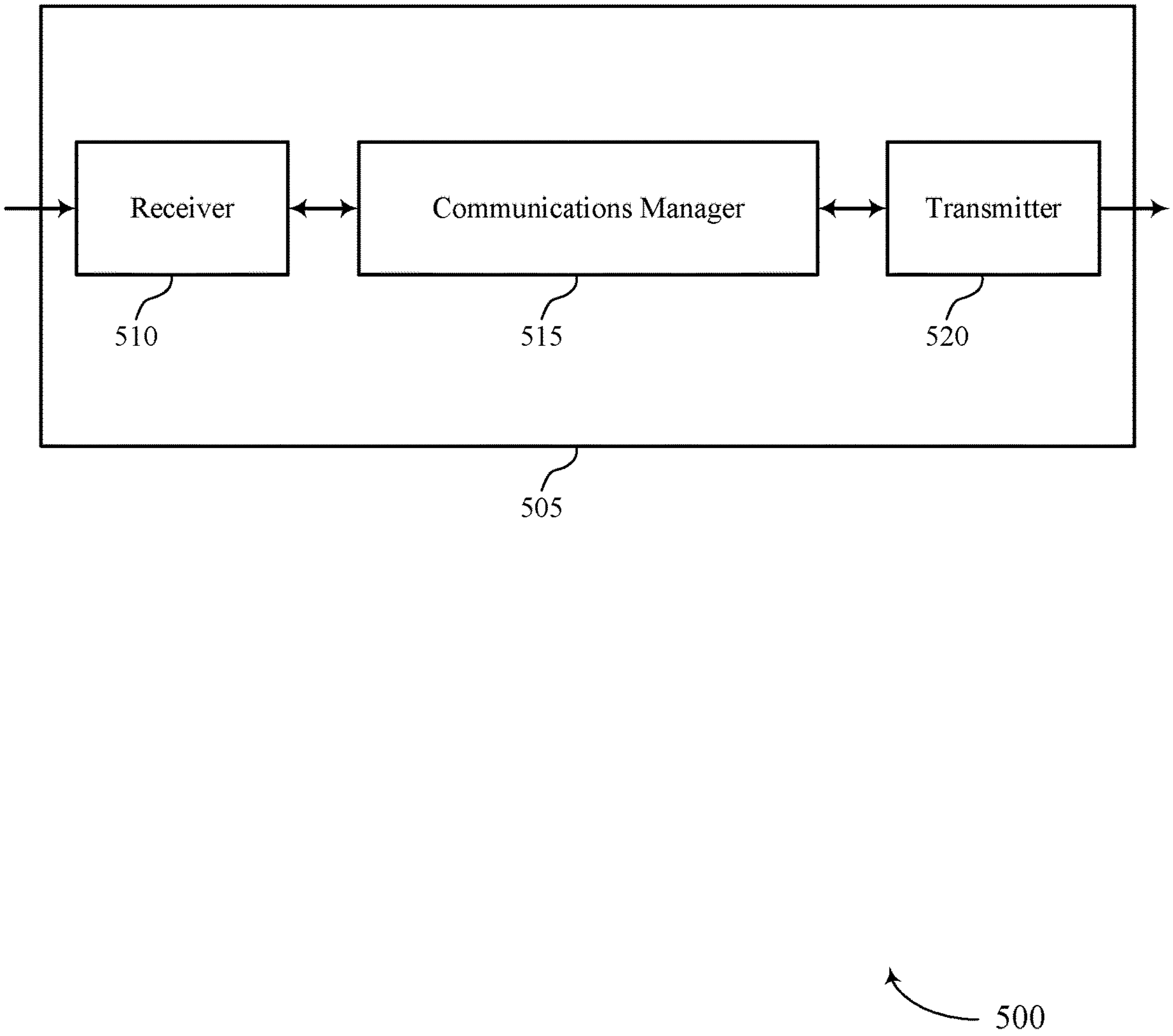
FIGS. 5 and 6 show block diagrams of devices that support techniques for enhancing page sharing using a channel quality-based merge condition for dual-subscription devices in accordance with various aspects of the present disclosure.

FIG. 5 shows a block diagram 500 of a device 505 that supports techniques for enhancing page sharing using a channel quality-based merge condition for dual-subscription devices in accordance with various aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for enhancing page sharing using a channel quality-based merge condition for dual-subscription devices, etc.). Information may be passed on to other components of the device 505. The receiver 510 may be an example of aspects of the transceiver 820 described with reference to FIG. 8. The receiver 510 may utilize a single antenna or a set of antennas.

In some implementations, the communications manager 515 may identify a first subscription of the UE is in an active mode with a first cell, identify a second subscription of the UE is in an idle mode with a second cell, identify a first mode of operation of the UE, where the first mode of operation includes using the first subscription to perform idle mode measurements for the second subscription, exit the first mode of operation based on the failure to satisfy the threshold channel quality, determine that a first channel quality associated with a first communication link between the UE and the first cell fails to satisfy a threshold channel quality, and perform the idle mode measurements for the second subscription using the second subscription based on the UE exiting the first mode of operation.

Additionally or alternatively, the communications manager 515 may identify a first subscription of the UE is in an active mode with a first cell, identify a second subscription of the UE is in an idle mode with a second cell, determine that a criteria is satisfied for entering a first mode of operation where the UE uses the first subscription to perform idle mode measurements for the second subscription, postpone initiation of the first mode of operation based on the failure to satisfy the threshold channel quality, and determine that a first channel quality associated with a first communication link between the UE and the first cell fails to satisfy a threshold channel quality. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and the transmitter 520 may be implemented as analog components (for example, amplifiers, filters, antennas) coupled to the mobile device modem to enable wireless transmission and reception over one or more bands.

The communications manager 515 may be implemented to realize one or more potential advantages. In some implementations, the communications manager 515 may determine whether to exit or postpone initiation of a merged state of the first subscription and the second subscription based on a channel quality-based merge condition. As such, the communications manager 515 may avoid unnecessarily long durations during which the communications manager 515 may sub-optimally perform idle mode measurements for the second subscription or avoid getting the second subscription stuck in a poor connectivity scenario, as described in more detail with reference to FIG. 2. Accordingly, the communications manager 515 may provide more seamless coverage for paging messages and various other idle mode measurements for the second subscription.

Further, based on employing a timer for delaying any attempts to enter (or re-enter) a merged state, the communications manager 515 may improve power savings and increase battery life for the device 505 based on potentially reducing a number of back-to-back merge-then-split scenarios in which the first and second subscription of the communications manager 515 may oscillate in and out of the merged state.

Figure 6:
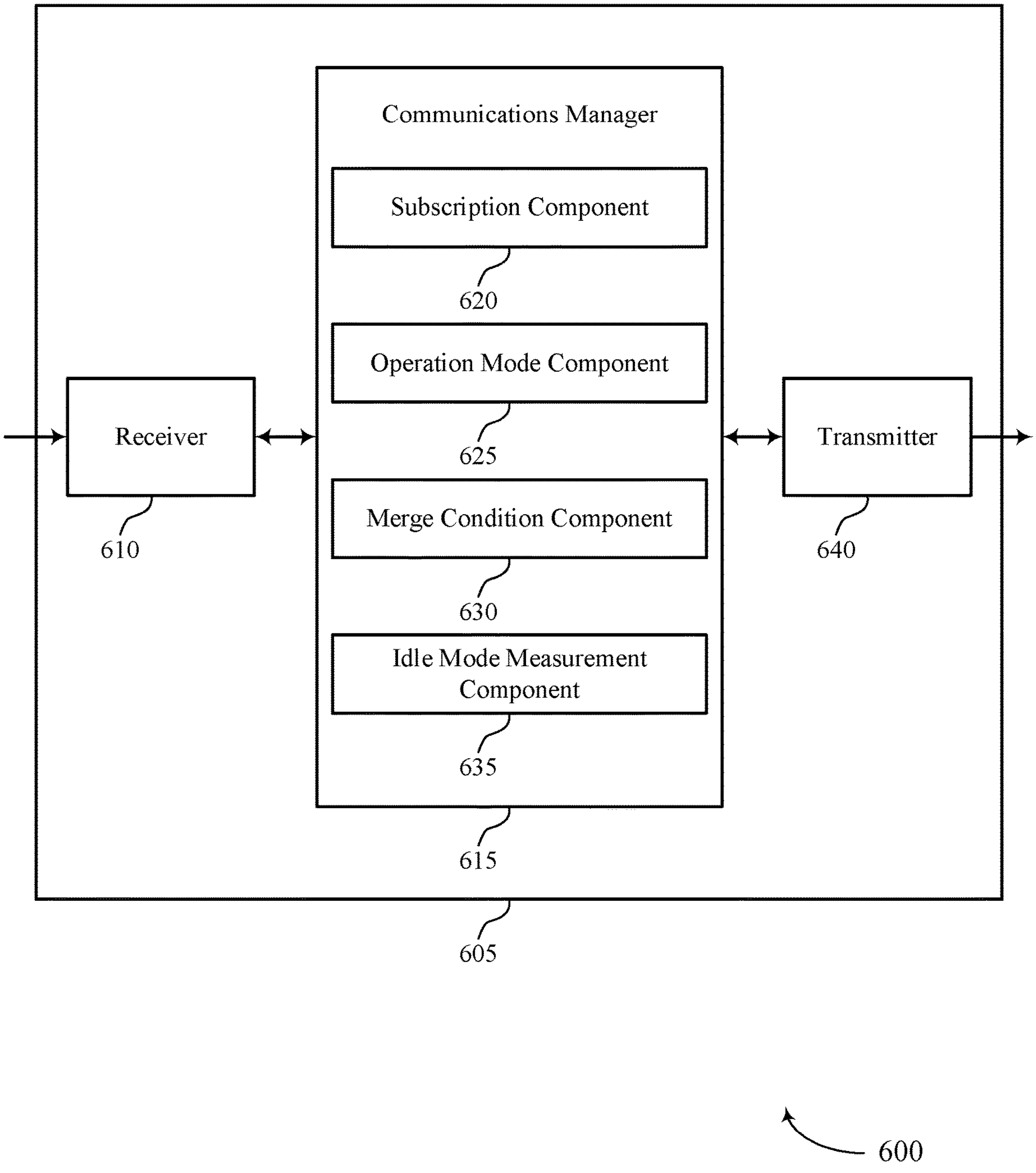

FIG. 6 shows a block diagram 600 of a device 605 that supports techniques for enhancing page sharing using a channel quality-based merge condition for dual-subscription devices in accordance with various aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for enhancing page sharing using a channel quality-based merge condition for dual-subscription devices, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a subscription component 620, an operation mode component 625, a merge condition component 630, and an idle mode measurement component 635. The communications manager 615 may be an example of aspects of the communications manager 810 described herein.

In some implementations, the communications manager 615 may operate to exit a merged state based on the channel quality-based merge condition. The subscription component 620 may identify a first subscription of the UE is in an active mode with a first cell and identify a second subscription of the UE is in an idle mode with a second cell. The operation mode component 625 may identify a first mode of operation of the UE, where the first mode of operation includes using the first subscription to perform idle mode measurements for the second subscription and exit the first mode of operation based on the failure to satisfy the threshold channel quality. The merge condition component 630 may determine that a first channel quality associated with a first communication link between the UE and the first cell fails to satisfy a threshold channel quality. The idle mode measurement component 635 may perform the idle mode measurements for the second subscription using the second subscription based on the UE exiting the first mode of operation.

Additionally or alternatively, the communications manager 615 may operate to postpone initiation of a merged state based on the channel quality-based merge condition. The subscription component 620 may identify a first subscription of the UE is in an active mode with a first cell and identify a second subscription of the UE is in an idle mode with a second cell. The operation mode component 625 may determine that a criteria is satisfied for entering a first mode of operation where the UE uses the first subscription to perform idle mode measurements for the second subscription and postpone initiation of the first mode of operation based on the failure to satisfy the threshold channel quality. The merge condition component 630 may determine that a first channel quality associated with a first communication link between the UE and the first cell fails to satisfy a threshold channel quality.

The transmitter 640 may transmit signals generated by other components of the device 605. In some examples, the transmitter 640 may be collocated with a receiver 610 in a transceiver component. For example, the transmitter 640 may be an example of aspects of the transceiver 820 described with reference to FIG. 8. The transmitter 640 may utilize a single antenna or a set of antennas.

Figure 7:
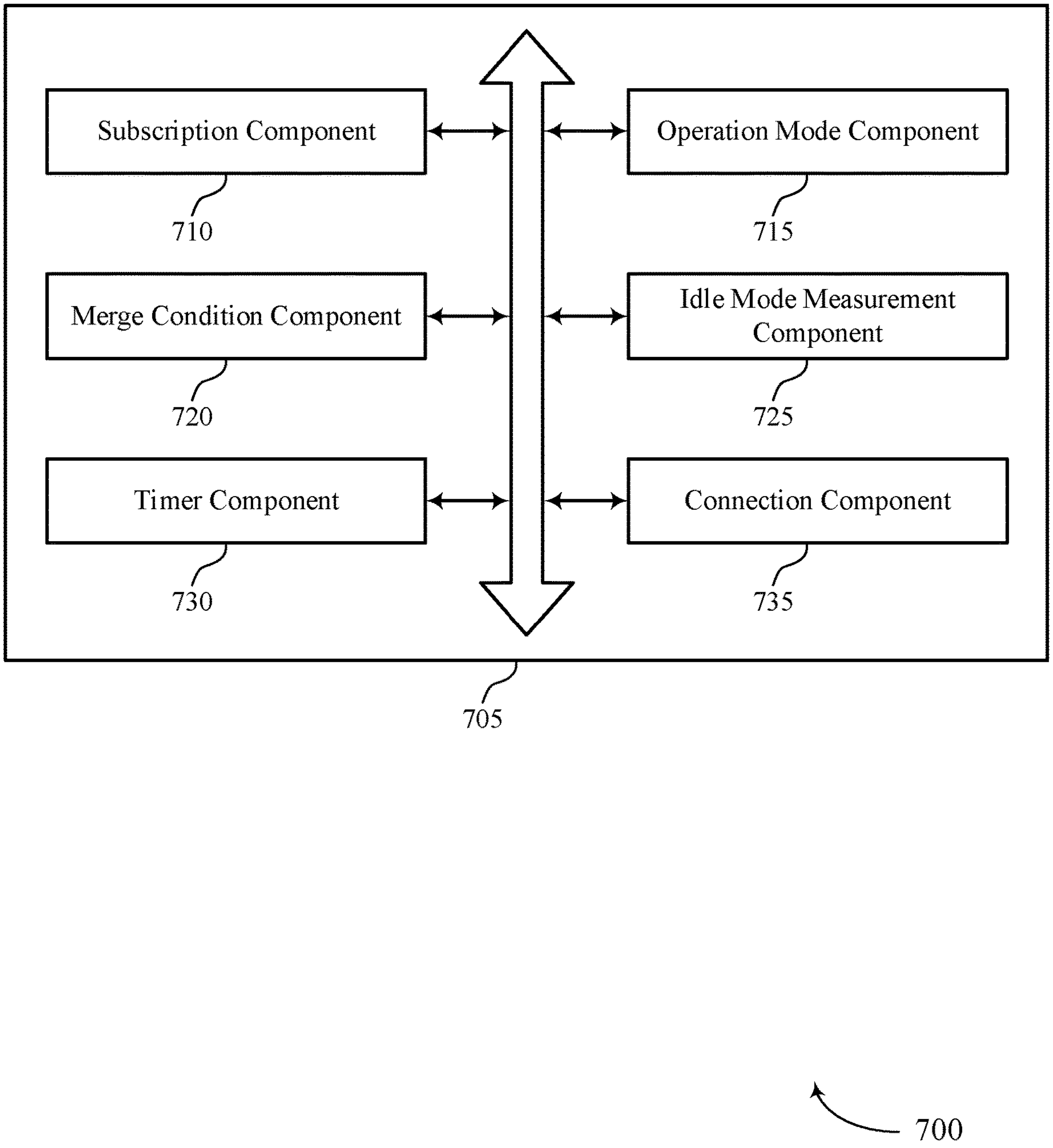
FIG. 7 shows a block diagram of a communications manager that supports techniques for enhancing page sharing using a channel quality-based merge condition for dual-subscription devices in accordance with various aspects of the present disclosure.

FIG. 7 shows a block diagram 700 of a communications manager 705 that supports techniques for enhancing page sharing using a channel quality-based merge condition for dual-subscription devices in accordance with various aspects of the present disclosure. The communications manager 705 may be an example of aspects of a communications manager 515, a communications manager 615, or a communications manager 810 described herein. The communications manager 705 may include a subscription component 710, an operation mode component 715, a merge condition component 720, an idle mode measurement component 725, a timer component 730, and a connection component 735. Each of these components may communicate, directly or indirectly, with one another (e.g., via one or more buses).

In some implementations, the communications manager 705 may operate to exit a merged state based on the channel quality-based merge condition.

The subscription component 710 may identify a first subscription of the UE is in an active mode with a first cell. In some examples, the subscription component 710 may identify a second subscription of the UE is in an idle mode with a second cell. In some cases, the first subscription is a default data subscription and the second subscription is a non-default data subscription.

The operation mode component 715 may identify a first mode of operation of the UE, where the first mode of operation includes using the first subscription to perform idle mode measurements for the second subscription. In some examples, the operation mode component 715 may exit the first mode of operation based on the failure to satisfy the threshold channel quality. In some examples, the operation mode component 715 may determine whether to re-enter the first mode of operation based on whether the second channel quality satisfies the threshold channel quality.

In some examples, the operation mode component 715 may determine whether to re-enter the first mode of operation based on whether the first channel quality satisfies the threshold channel quality. In some examples, the operation mode component 715 may exit the first mode of operation based on a radio resource control protocol trigger, where the radio resource control protocol trigger is activated based on the failure to satisfy the threshold channel quality. The merge condition component 720 may determine that a first channel quality associated with a first communication link between the UE and the first cell fails to satisfy a threshold channel quality.

In some examples, the merge condition component 720 may determine whether a second channel quality associated with a second communication link between the UE and the third cell satisfies the threshold channel quality. In some examples, the merge condition component 720 may determine whether the first channel quality associated with the first communication link between the UE and the first cell satisfies the threshold channel quality. In some cases, the failure to satisfy the threshold channel quality includes a failure to satisfy a channel quality-based merge condition associated with the first mode of operation. In some cases, the first channel quality includes an RSRP or an SNR. In some examples, the merge condition component 720 may detect a threshold quantity of consecutive CRC failures associated with a data channel of the first communication link based on a P-RNTI, where the failure to satisfy the threshold channel quality is based on detecting the threshold quantity of consecutive CRC failures associated with the data channel.

The idle mode measurement component 725 may perform the idle mode measurements for the second subscription using the second subscription based on the UE exiting the first mode of operation.

The timer component 730 may initiate a timer based on the UE exiting the first mode of operation, where the idle mode measurements for the second subscription are performed using the second subscription during at least a duration of the timer. In some examples, the timer component 730 may terminate the timer based on establishment of the connection with the third cell using the first subscription. In some examples, the timer component 730 may determine that the timer expires.

The connection component 735 may determine, during the duration of the timer, that the UE establishes a connection with a third cell using the first subscription.

Additionally or alternatively, the communications manager 705 may operate to postpone initiation of the merged state based on the channel quality-based merge condition.

In some examples, the subscription component 710 may identify a first subscription of the UE is in an active mode with a first cell. In some examples, the subscription component 710 may identify a second subscription of the UE is in an idle mode with a second cell. In some examples, the subscription component 710 may determine that the second subscription is capable of the first mode of operation with the first subscription using the first cell, where determining that the criteria is satisfied for entering the first mode of operation is based on determining that the second subscription is capable of the first mode of operation with the first subscription using the first cell. In some cases, the first subscription is a default data subscription and the second subscription is a non-default data subscription.

In some examples, the operation mode component 715 may determine that a criteria is satisfied for entering a first mode of operation where the UE uses the first subscription to perform idle mode measurements for the second subscription. In some examples, the operation mode component 715 may postpone initiation of the first mode of operation based on the failure to satisfy the threshold channel quality. In some examples, the merge condition component 720 may determine that a first channel quality associated with a first communication link between the UE and the first cell fails to satisfy a threshold channel quality.

In some examples, the operation mode component 715 may determine that the initiation of the first mode of operation has been triggered by a radio resource control protocol of the UE. In some examples, the operation mode component 715 may determine whether to initiate the first mode of operation based on whether the second channel quality satisfies the threshold channel quality. In some examples, the operation mode component 715 may determine whether to initiate the first mode of operation based on whether the first channel quality satisfies the threshold channel quality.

In some examples, the merge condition component 720 may determine whether a second channel quality associated with a second communication link between the UE and the third cell satisfies the threshold channel quality. In some examples, the merge condition component 720 may determine whether the first channel quality associated with the first communication link between the UE and the first cell satisfies the threshold channel quality. In some cases, the failure to satisfy the threshold channel quality includes a failure to satisfy a channel quality-based merge condition associated with the first mode of operation. In some cases, the first channel quality includes an RSRP or an SNR. In some examples, the merge condition component 720 may detect a threshold quantity of consecutive CRC failures associated with a data channel of the first communication link based on a P-RNTI, where the failure to satisfy the threshold channel quality is based on detecting the threshold quantity of consecutive CRC failures associated with the data channel.

In some examples, the timer component 730 may initiate a timer based on the failure to satisfy the threshold channel quality, where the initiation of the first mode of operation is postponed during at least a duration of the timer. In some examples, the timer component 730 may terminate the timer based on establishment of the connection with the third cell using the first subscription. In some examples, the timer component 730 may determine that the timer expires.

In some examples, the connection component 735 may determine, during the duration of the timer, that the UE establishes a connection with a third cell using the first subscription. In some examples, the subscription component 710 may identify that the first subscription of the UE transitions to an idle mode with the first cell. In some examples, the connection component 735 may initiate a cell re-selection and measurement for the first subscription.

Figure 8:
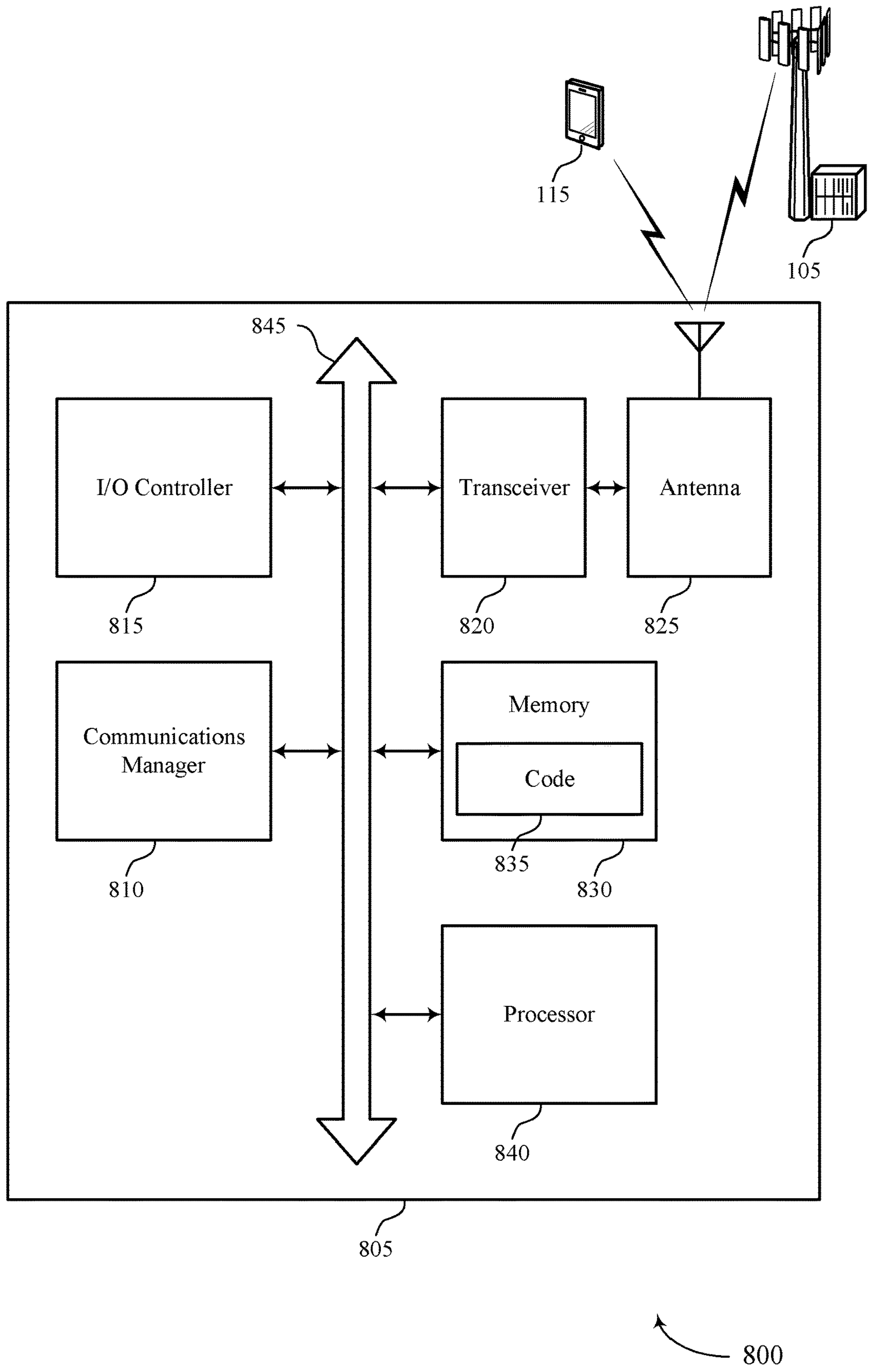
FIG. 8 shows a diagram of a system including a device that supports techniques for enhancing page sharing using a channel quality-based merge condition for dual-subscription devices in accordance with various aspects of the present disclosure.

FIG. 8 shows a diagram of a system 800 including a device 805 that supports techniques for enhancing page sharing using a channel quality-based merge condition for dual-subscription devices in accordance with various aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In some implementations, the communications manager 810 may identify a first subscription of the UE is in an active mode with a first cell, identify a second subscription of the UE is in an idle mode with a second cell, identify a first mode of operation of the UE, where the first mode of operation includes using the first subscription to perform idle mode measurements for the second subscription, exit the first mode of operation based on the failure to satisfy the threshold channel quality, determine that a first channel quality associated with a first communication link between the UE and the first cell fails to satisfy a threshold channel quality, and perform the idle mode measurements for the second subscription using the second subscription based on the UE exiting the first mode of operation.

Additionally or alternatively, the communications manager 810 may identify a first subscription of the UE is in an active mode with a first cell, identify a second subscription of the UE is in an idle mode with a second cell, determine that a criteria is satisfied for entering a first mode of operation where the UE uses the first subscription to perform idle mode measurements for the second subscription, postpone initiation of the first mode of operation based on the failure to satisfy the threshold channel quality, and determine that a first channel quality associated with a first communication link between the UE and the first cell fails to satisfy a threshold channel quality.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for enhancing page sharing using a channel quality-based merge condition for dual-subscription devices).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
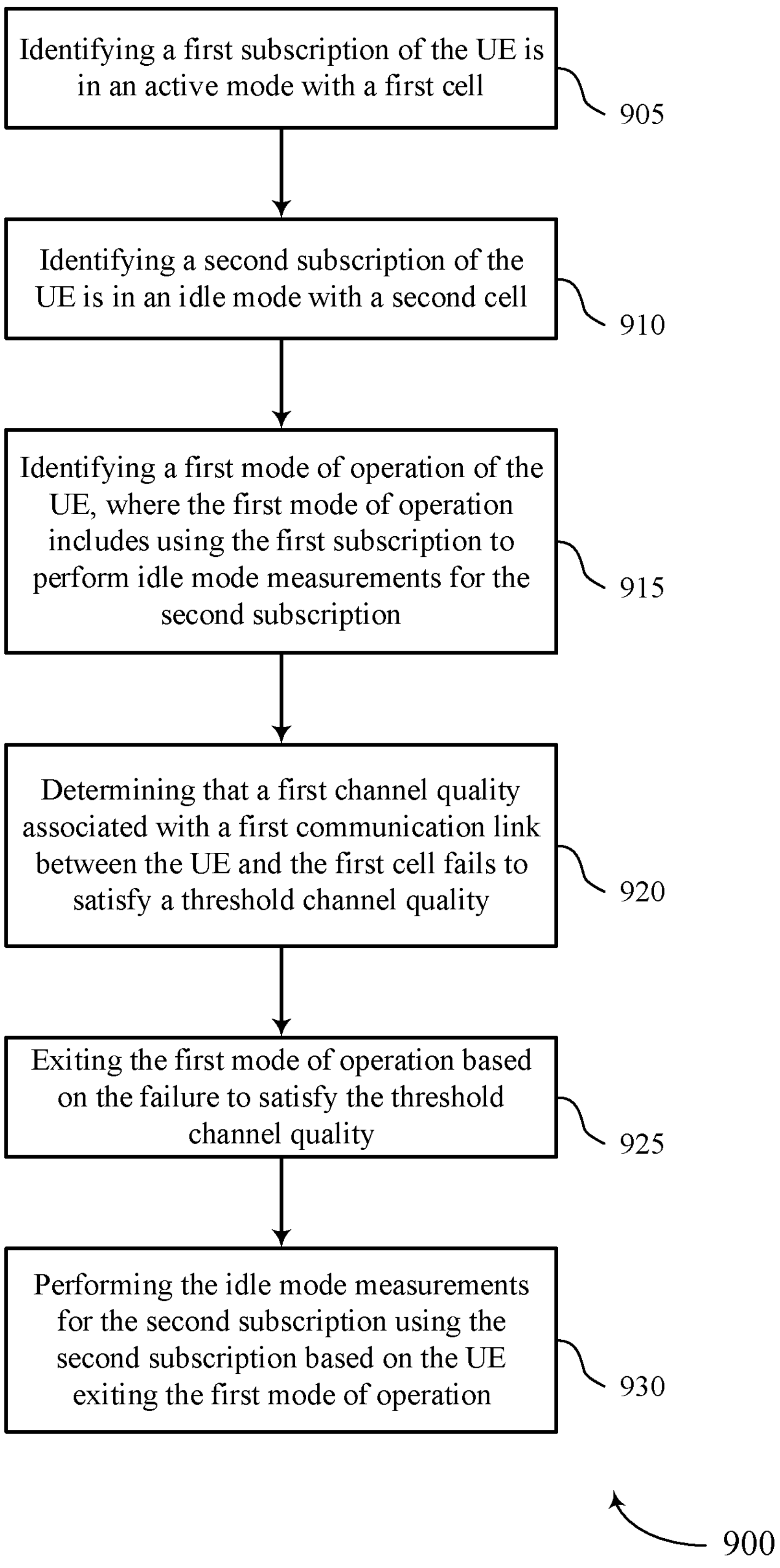
FIGS. 9 through 12 show flowcharts illustrating methods that support techniques for enhancing page sharing using a channel quality-based merge condition for dual-subscription devices in accordance with various aspects of the present disclosure.

FIG. 9 shows a flowchart illustrating a method 900 that supports techniques for enhancing page sharing using a channel quality-based merge condition for dual-subscription devices in accordance with various aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may identify a first subscription of the UE is in an active mode with a first cell. The operations of 905 may be performed according to the methods described herein. In some examples, aspects of the operations of 905 may be performed by a subscription component as described with reference to FIGS. 5 through 8.

At 910, the UE may identify a second subscription of the UE is in an idle mode with a second cell. The operations of 910 may be performed according to the methods described herein. In some examples, aspects of the operations of 910 may be performed by a subscription component as described with reference to FIGS. 5 through 8.

At 915, the UE may identify a first mode of operation of the UE, where the first mode of operation includes using the first subscription to perform idle mode measurements for the second subscription. The operations of 915 may be performed according to the methods described herein. In some examples, aspects of the operations of 915 may be performed by an operation mode component as described with reference to FIGS. 5 through 8.

At 920, the UE may determine that a first channel quality associated with a first communication link between the UE and the first cell fails to satisfy a threshold channel quality. The operations of 920 may be performed according to the methods described herein. In some examples, aspects of the operations of 920 may be performed by a merge condition component as described with reference to FIGS. 5 through 8.

At 925, the UE may exit the first mode of operation based on the failure to satisfy the threshold channel quality. The operations of 925 may be performed according to the methods described herein. In some examples, aspects of the operations of 925 may be performed by an operation mode component as described with reference to FIGS. 5 through 8.

At 930, the UE may perform the idle mode measurements for the second subscription using the second subscription based on the UE exiting the first mode of operation. The operations of 930 may be performed according to the methods described herein. In some examples, aspects of the operations of 930 may be performed by an idle mode measurement component as described with reference to FIGS. 5 through 8.

Figure 10:
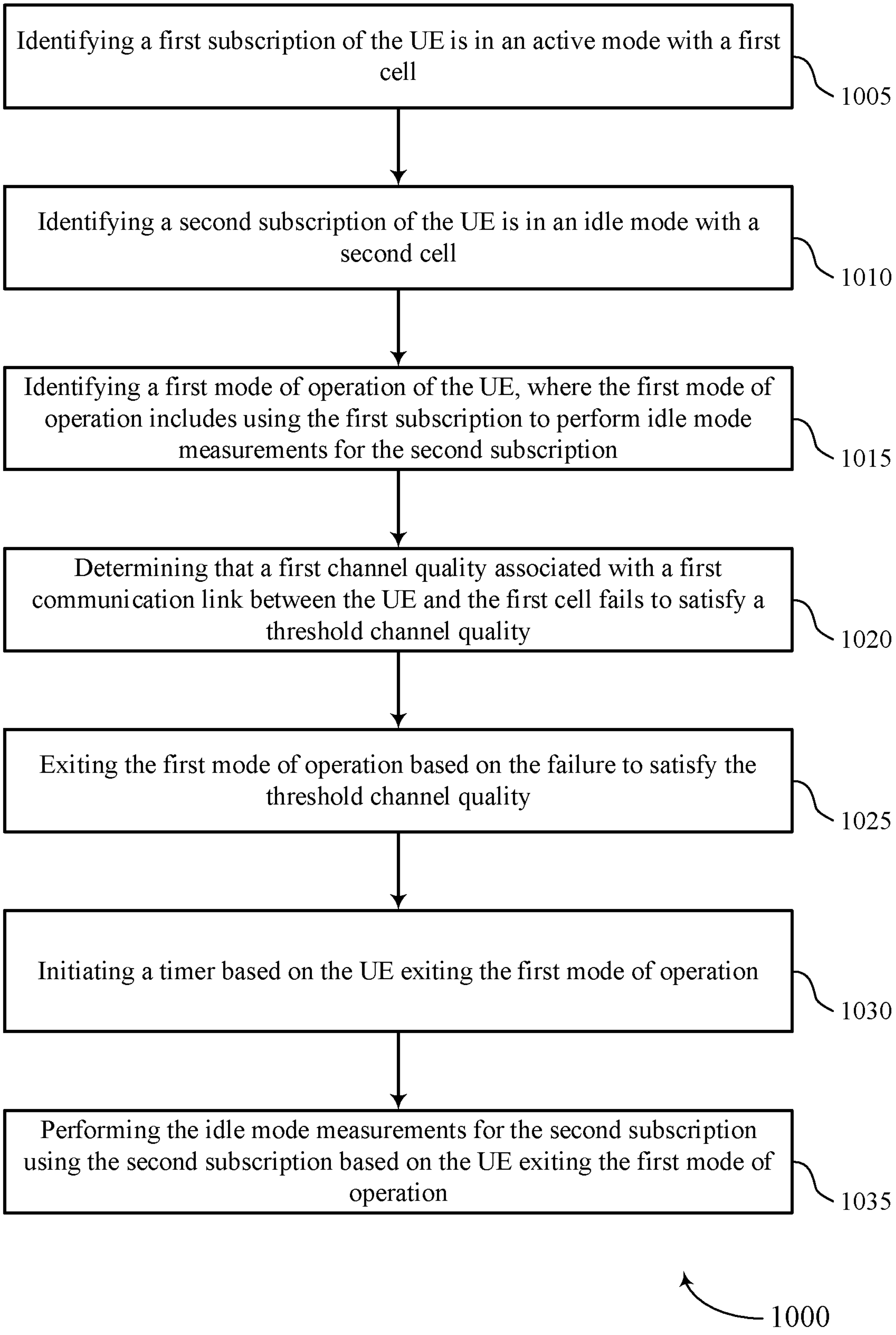

FIG. 10 shows a flowchart illustrating a method 1000 that supports techniques for enhancing page sharing using a channel quality-based merge condition for dual-subscription devices in accordance with various aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may identify a first subscription of the UE is in an active mode with a first cell. The operations of 1005 may be performed according to the methods described herein. In some examples, aspects of the operations of 1005 may be performed by a subscription component as described with reference to FIGS. 5 through 8.

At 1010, the UE may identify a second subscription of the UE is in an idle mode with a second cell. The operations of 1010 may be performed according to the methods described herein. In some examples, aspects of the operations of 1010 may be performed by a subscription component as described with reference to FIGS. 5 through 8.

At 1015, the UE may identify a first mode of operation of the UE, where the first mode of operation includes using the first subscription to perform idle mode measurements for the second subscription. The operations of 1015 may be performed according to the methods described herein. In some examples, aspects of the operations of 1015 may be performed by an operation mode component as described with reference to FIGS. 5 through 8.

At 1020, the UE may determine that a first channel quality associated with a first communication link between the UE and the first cell fails to satisfy a threshold channel quality. The operations of 1020 may be performed according to the methods described herein. In some examples, aspects of the operations of 1020 may be performed by a merge condition component as described with reference to FIGS. 5 through 8.

At 1025, the UE may exit the first mode of operation based on the failure to satisfy the threshold channel quality. The operations of 1025 may be performed according to the methods described herein. In some examples, aspects of the operations of 1025 may be performed by an operation mode component as described with reference to FIGS. 5 through 8.

At 1030, the UE may initiate a timer based on the UE exiting the first mode of operation. In some examples, the idle mode measurements for the second subscription are performed using the second subscription during at least a duration of the timer. The operations of 1030 may be performed according to the methods described herein. In some examples, aspects of the operations of 1030 may be performed by a timer component as described with reference to FIGS. 5 through 8.

At 1035, the UE may perform the idle mode measurements for the second subscription using the second subscription based on the UE exiting the first mode of operation. The operations of 1035 may be performed according to the methods described herein. In some examples, aspects of the operations of 1035 may be performed by an idle mode measurement component as described with reference to FIGS. 5 through 8.

Figure 11:
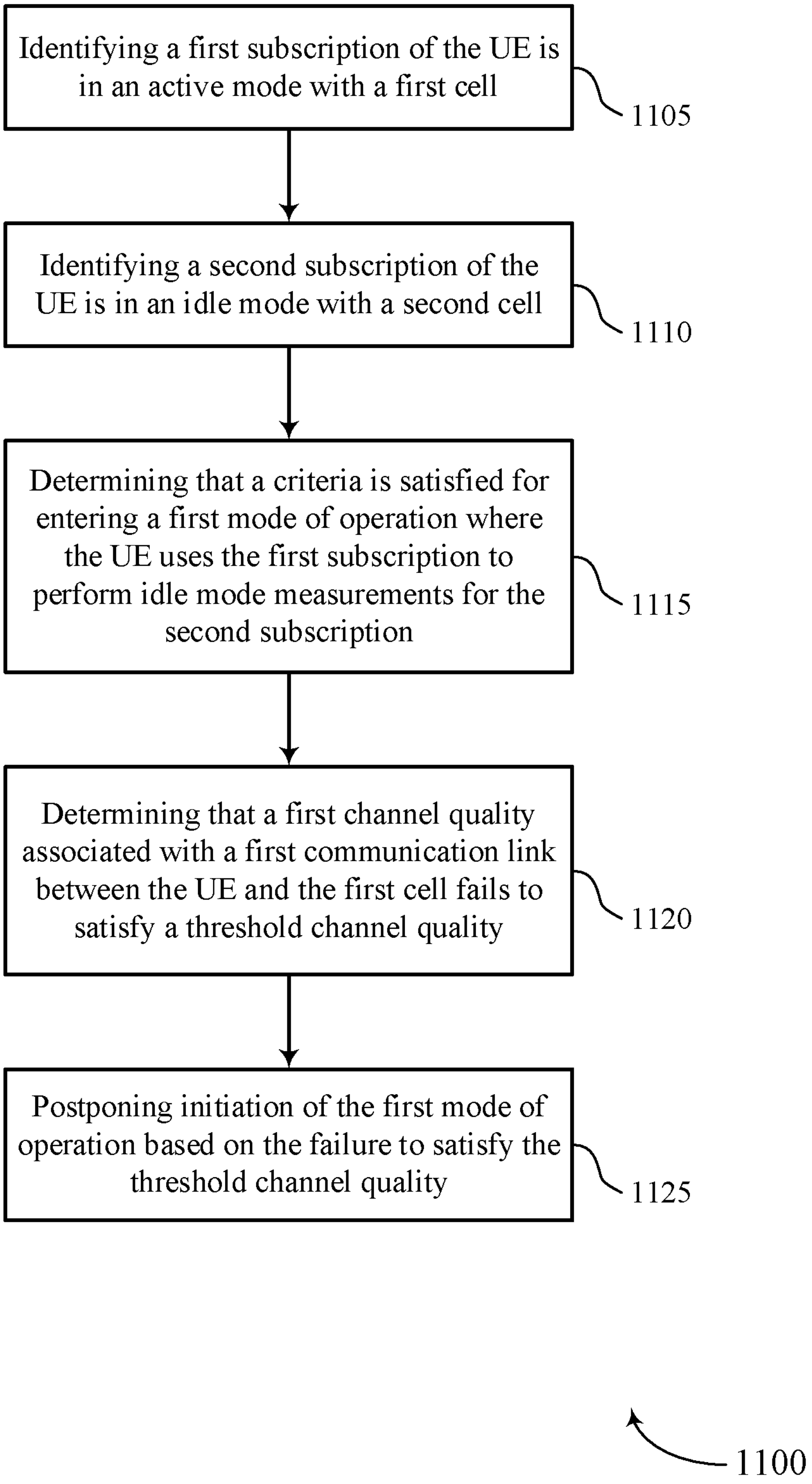

FIG. 11 shows a flowchart illustrating a method 1100 that supports techniques for enhancing page sharing using a channel quality-based merge condition for dual-subscription devices in accordance with various aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may identify a first subscription of the UE is in an active mode with a first cell. The operations of 1105 may be performed according to the methods described herein. In some examples, aspects of the operations of 1105 may be performed by a subscription component as described with reference to FIGS. 5 through 8.

At 1110, the UE may identify a second subscription of the UE is in an idle mode with a second cell. The operations of 1110 may be performed according to the methods described herein. In some examples, aspects of the operations of 1110 may be performed by a subscription component as described with reference to FIGS. 5 through 8.

At 1115, the UE may determine that a criteria is satisfied for entering a first mode of operation where the UE uses the first subscription to perform idle mode measurements for the second subscription. The operations of 1115 may be performed according to the methods described herein. In some examples, aspects of the operations of 1115 may be performed by an operation mode component as described with reference to FIGS. 5 through 8.

At 1120, the UE may determine that a first channel quality associated with a first communication link between the UE and the first cell fails to satisfy a threshold channel quality. The operations of 1120 may be performed according to the methods described herein. In some examples, aspects of the operations of 1120 may be performed by a merge condition component as described with reference to FIGS. 5 through 8.

At 1125, the UE may postpone initiation of the first mode of operation based on the failure to satisfy the threshold channel quality. The operations of 1125 may be performed according to the methods described herein. In some examples, aspects of the operations of 1125 may be performed by an operation mode component as described with reference to FIGS. 5 through 8.

Figure 12:
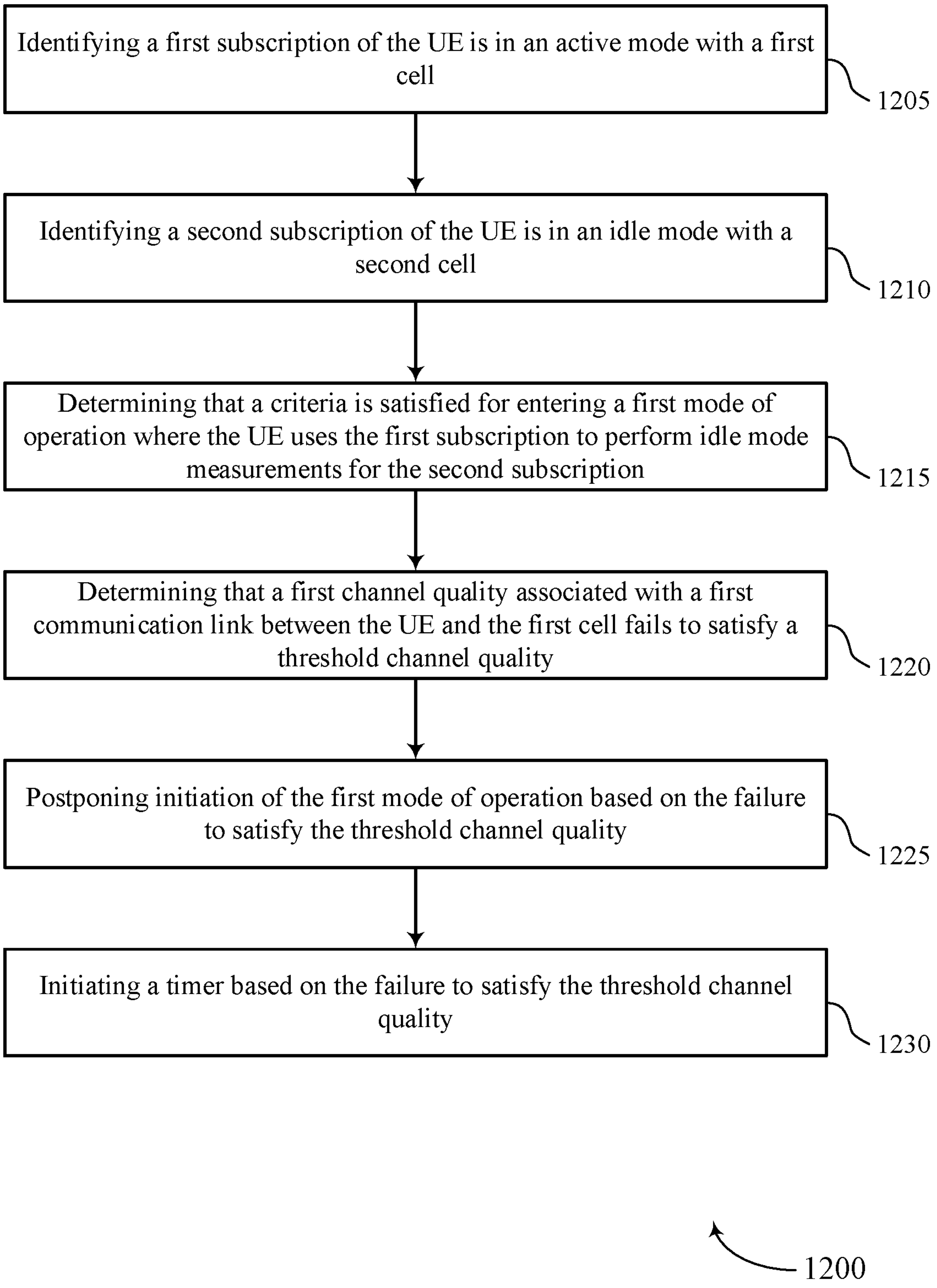

FIG. 12 shows a flowchart illustrating a method 1200 that supports techniques for enhancing page sharing using a channel quality-based merge condition for dual-subscription devices in accordance with various aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the UE may identify a first subscription of the UE is in an active mode with a first cell. The operations of 1205 may be performed according to the methods described herein. In some examples, aspects of the operations of 1205 may be performed by a subscription component as described with reference to FIGS. 5 through 8.

At 1210, the UE may identify a second subscription of the UE is in an idle mode with a second cell. The operations of 1210 may be performed according to the methods described herein. In some examples, aspects of the operations of 1210 may be performed by a subscription component as described with reference to FIGS. 5 through 8.

At 1215, the UE may determine that a criteria is satisfied for entering a first mode of operation where the UE uses the first subscription to perform idle mode measurements for the second subscription. The operations of 1215 may be performed according to the methods described herein. In some examples, aspects of the operations of 1215 may be performed by an operation mode component as described with reference to FIGS. 5 through 8.

At 1220, the UE may determine that a first channel quality associated with a first communication link between the UE and the first cell fails to satisfy a threshold channel quality. The operations of 1220 may be performed according to the methods described herein. In some examples, aspects of the operations of 1220 may be performed by a merge condition component as described with reference to FIGS. 5 through 8.

At 1225, the UE may postpone initiation of the first mode of operation based on the failure to satisfy the threshold channel quality. The operations of 1225 may be performed according to the methods described herein. In some examples, aspects of the operations of 1225 may be performed by an operation mode component as described with reference to FIGS. 5 through 8.

At 1230, the UE may initiate a timer based on the failure to satisfy the threshold channel quality. In some examples, the initiation of the first mode of operation is postponed during at least a duration of the timer. The operations of 1230 may be performed according to the methods described herein. In some examples, aspects of the operations of 1230 may be performed by a timer component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium.

Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes examples and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

identifying a first subscription of the UE is in an active mode with a first cell;

identifying a second subscription of the UE is in an idle mode with a second cell;

identifying a first mode of operation of the UE, wherein the first mode of operation comprises merging the first subscription and the second subscription by using the first subscription and the first cell to perform one or more measurements for the second subscription;

determining that a first channel quality associated with a first communication link between the UE and the first cell fails to satisfy a threshold channel quality;

exiting the first mode of operation based at least in part on the failure to satisfy the threshold channel quality, wherein the failure to satisfy the threshold channel quality comprises a failure to satisfy a channel quality-based merge condition associated with the first mode of operation and wherein exiting the first mode of operation comprises splitting the first subscription and the second subscription to enter a second mode of operation;

initiating a timer based at least in part on the UE exiting the first mode of operation; and performing, as part of the second mode of operation, the one or more measurements for the second subscription using the second subscription based at least in part on the UE splitting the first subscription and the second subscription, wherein the one or more measurements for the second subscription are performed using the second subscription during at least a duration of the timer.

2. The method of claim 1, further comprising:

determining, during the duration of the timer, that the UE establishes a connection with a third cell using the first subscription;

terminating the timer based at least in part on establishment of the connection with the third cell using the first subscription;

determining whether a second channel quality associated with a second communication link between the UE and the third cell satisfies the threshold channel quality; and determining whether to re-enter the first mode of operation based at least in part on whether the second channel quality satisfies the threshold channel quality.

3. The method of claim 1, further comprising:

determining that the timer expires;

determining whether the first channel quality associated with the first communication link between the UE and the first cell satisfies the threshold channel quality; and determining whether to re-enter the first mode of operation based at least in part on whether the first channel quality satisfies the threshold channel quality.

4. The method of claim 1, wherein exiting the first mode of operation comprises:

exiting the first mode of operation based at least in part on a radio resource control protocol trigger, wherein the radio resource control protocol trigger is activated based at least in part on the failure to satisfy the threshold channel quality.

5. The method of claim 1, further comprising:

detecting a threshold quantity of consecutive cyclic redundancy check failures associated with a data channel of the first communication link based at least in part on a paging radio network temporary identifier (P-RNTI), wherein the failure to satisfy the threshold channel quality is based at least in part on detecting the threshold quantity of consecutive cyclic redundancy check failures associated with the data channel.

6. The method of claim 1, wherein the first channel quality comprises a reference signal received power or a signal-to-noise ratio.

7. The method of claim 1, wherein the first subscription is a default data subscription and the second subscription is a non-default data subscription.

8. A method for wireless communication at a user equipment (UE), comprising:

identifying a first subscription of the UE is in an active mode with a first cell;

identifying a second subscription of the UE is in an idle mode with a second cell;

determining that a criteria is satisfied for entering a first mode of operation, wherein the first mode of operation comprises merging the first subscription and the second subscription by using the first subscription and the first cell to perform one or more measurements for the second subscription;

determining that a first channel quality associated with a first communication link between the UE and the first cell fails to satisfy a threshold channel quality;

postponing initiation of the first mode of operation based at least in part on the failure to satisfy the threshold channel quality, wherein the failure to satisfy the threshold channel quality comprises a failure to satisfy a channel quality-based merge condition associated with the first mode of operation; and initiating a timer based at least in part on the failure to satisfy the threshold channel quality, wherein the initiation of the first mode of operation is postponed during at least a duration of the timer.

9. The method of claim 8, further comprising:

identifying that the first subscription of the UE transitions to an idle mode with the first cell; and initiating a cell re-selection and measurement for the first subscription.

10. The method of claim 8, further comprising:

determining, during the duration of the timer, that the UE establishes a connection with a third cell using the first subscription;

terminating the timer based at least in part on establishment of the connection with the third cell using the first subscription;

determining whether a second channel quality associated with a second communication link between the UE and the third cell satisfies the threshold channel quality; and determining whether to initiate the first mode of operation based at least in part on whether the second channel quality satisfies the threshold channel quality.

11. The method of claim 8, further comprising:

determining that the timer expires;

determining whether the first channel quality associated with the first communication link between the UE and the first cell satisfies the threshold channel quality; and determining whether to initiate the first mode of operation based at least in part on whether the first channel quality satisfies the threshold channel quality.

12. The method of claim 8, further comprising:

determining that the second subscription is capable of the first mode of operation with the first subscription using the first cell, wherein determining that the criteria is satisfied for entering the first mode of operation is based at least in part on determining that the second subscription is capable of the first mode of operation with the first subscription using the first cell.

13. The method of claim 8, wherein determining that the criteria is satisfied for entering the first mode of operation comprises:

determining that the initiation of the first mode of operation has been triggered by a radio resource control protocol of the UE.

14. The method of claim 8, further comprising:

detecting a threshold quantity of consecutive cyclic redundancy check failures associated with a data channel of the first communication link based at least in part on a paging radio network temporary identifier (P-RNTI), wherein the failure to satisfy the threshold channel quality is based at least in part on detecting the threshold quantity of consecutive cyclic redundancy check failures associated with the data channel.

15. The method of claim 8, wherein the first channel quality comprises a reference signal received power or a signal-to-noise ratio.

16. The method of claim 8, wherein the first subscription is a default data subscription and the second subscription is a non-default data subscription.

17. A user equipment (UE) for wireless communication, comprising:

one or more processors;

memory coupled with the one or more processors; and instructions stored in the memory and executable by the one or more processors to cause the UE to:

identify a first subscription of the UE is in an active mode with a first cell;

identify a second subscription of the UE is in an idle mode with a second cell;

identify a first mode of operation of the UE, wherein the first mode of operation comprises merging the first subscription and the second subscription by using the first subscription and the first cell to perform one or more measurements for the second subscription;

determine that a first channel quality associated with a first communication link between the UE and the first cell fails to satisfy a threshold channel quality;

exiting the first mode of operation based at least in part on the failure to satisfy the threshold channel quality, wherein the failure to satisfy the threshold channel quality comprises a failure to satisfy a channel quality-based merge condition associated with the first mode of operation and wherein exiting the first mode of operation comprises splitting the first subscription and the second subscription to enter a second mode of operation;

initiate a timer based at least in part on the UE exiting the first mode of operation; and perform, as part of the second mode of operation, the one or more measurements for the second subscription using the second subscription based at least in part on the UE splitting the first subscription and the second subscription, wherein the one or more measurements for the second subscription are performed using the second subscription during at least a duration of the timer.

18. The UE of claim 17, wherein the instructions are further executable by the one or more processors to cause the UE to:

determine, during the duration of the timer, that the UE establishes a 4 connection with a third cell using the first subscription;

terminate the timer based at least in part on establishment of the connection with the third cell using the first subscription;

determine whether a second channel quality associated with a second communication link between the UE and the third cell satisfies the threshold channel quality; and determine whether to re-enter the first mode of operation based at least in part on whether the second channel quality satisfies the threshold channel quality.

19. The UE of claim 17, wherein the instructions are further executable by the one or more processors to cause the UE to:

determine that the timer expires;

determine whether the first channel quality associated with the first communication link between the UE and the first cell satisfies the threshold channel quality; and determine whether to re-enter the first mode of operation based at least in part on whether the first channel quality satisfies the threshold channel quality.

20. The UE of claim 17, wherein the instructions to exit the first mode of operation are executable by the one or more processors to cause the UE to:

exit the first mode of operation based at least in part on a radio resource control protocol trigger, wherein the radio resource control protocol trigger is activated based at least in part on the failure to satisfy the threshold channel quality.

21. The UE of claim 17, wherein the instructions are further executable by the one or more processors to cause the UE to:

detect a threshold quantity of consecutive cyclic redundancy check failures associated with a data channel of the first communication link based at least in part on a paging radio network temporary identifier (P-RNTI), wherein the failure to satisfy the threshold channel quality is based at least in part on detecting the threshold quantity of consecutive cyclic redundancy check failures associated with the data channel.

22. A user equipment (UE) for wireless communication, comprising:

one or more processors, memory coupled with the one or more processors; and instructions stored in the memory and executable by the one or more processors to cause the UE to:

identify a first subscription of the UE is in an active mode with a first cell;

identify a second subscription of the UE is in an idle mode with a second cell;

determine that a criteria is satisfied for entering a first mode of operation wherein the first mode of operation comprises merging the first subscription and the second subscription by using the first subscription and the first cell to perform one or more measurements for the second subscription;

determine that a first channel quality associated with a first communication link between the UE and the first cell fails to satisfy a threshold channel quality;

postpone initiation of the first mode of operation based at least in part on the failure to satisfy the threshold channel quality, wherein the failure to satisfy the threshold channel quality comprises a failure to satisfy a channel quality-based merge condition associated with the first mode of operation; and initiate a timer based at least in part on the failure to satisfy the threshold channel quality, wherein the initiation of the first mode of operation is postponed during at least a duration of the timer.

23. The UE of claim 22, wherein the instructions are further executable by the one or more processors to cause the UE to:

identify that the first subscription of the UE transitions to an idle mode with the first cell; and initiate a cell re-selection and measurement for the first subscription.

24. The UE of claim 22, wherein the instructions are further executable by the one or more processors to cause the UE to:

determine, during the duration of the timer, that the UE establishes a connection with a third cell using the first subscription;

terminate the timer based at least in part on establishment of the connection with the third cell using the first subscription;

determine whether a second channel quality associated with a second communication link between the UE and the third cell satisfies the threshold channel quality; and determine whether to initiate the first mode of operation based at least in part on whether the second channel quality satisfies the threshold channel quality.

* * * * *